US012717339B2

(12) United States Patent
Xu et al.

(10) Patent No.: US 12,717,339 B2
(45) Date of Patent: Aug. 25, 2026

(54) ROBOTIC TOOL SYSTEM AND CONTROL METHOD THEREOF

(71) Applicant: Greenworks (Jiangsu) Co., Ltd., Changzhou (CN)

(72) Inventors: Wei Xu, Changzhou (CN); Yanliang Zhu, Changzhou (CN); Xian Zhuang, Changzhou (CN)

(73) Assignee: Greenworks (Jiangsu) Co., Ltd., Changzhou (CN)

( * ) Notice: Subject to any disclaimer, the term of this patent is extended or adjusted under 35 U.S.C. 154(b) by 534 days.

(21) Appl. No.: 18/321,798

(22) Filed: May 23, 2023

(65) Prior Publication Data

US 2023/0292657 A1 Sep. 21, 2023

Related U.S. Application Data

(63) Continuation of application No. PCT/CN2021/139509, filed on Dec. 20, 2021.

(30) Foreign Application Priority Data

Dec. 22, 2020 (CN) ......................... 202011528932.5
Dec. 22, 2020 (CN) ......................... 202023114272.4
(Continued)

(51) Int. Cl.
*G05D 1/243* (2024.01)
*A01D 34/00* (2006.01)
(Continued)

(52) U.S. Cl.
CPC ........... *G05D 1/243* (2024.01); *A01D 34/008* (2013.01); *G05D 1/2297* (2024.01); *G05D 1/246* (2024.01);
(Continued)

(58) Field of Classification Search
CPC .. G05D 2111/10; G05D 1/243; G05D 1/6484; G05D 2109/10
See application file for complete search history.

(56) References Cited

U.S. PATENT DOCUMENTS 11,464,161 B1 * 10/2022 Phanco ................ A01D 75/185
2004/0103659 A1 6/2004 Johnson
(Continued)

FOREIGN PATENT DOCUMENTS

CN 101091428 A 12/2007
CN 105200900 A 12/2015
(Continued)

OTHER PUBLICATIONS

English Translation CN-107608341-A (Year: 2018).*
English Translation CN-108332979-A (Year: 2018).*
English Translation CN-112393737-A (Year: 2021).*

*Primary Examiner* — Faris S Almatrahi
*Assistant Examiner* — Moises Gasca Alva

(57) ABSTRACT

A robotic tool system includes a robotic tool and a navigation control device. The robotic tool system is used to move in a working area and perform a work task. The navigation control device is detachably connected with the robotic tool and includes a navigation assembly, a planning assembly and a communication assembly. The navigation assembly is used to receive a position signal of the robotic tool and/or the navigation control device. The planning assembly is used to obtain a path map of the working area by fitting according to the position signal. The communication assembly is connected with the robotic tool, transmits the path map to the robotic tool, controls the robotic tool to run in the working area according to the path map and performs corresponding task or return to a charger station to realize an automatic charging connection.

20 Claims, 27 Drawing Sheets

(30) Foreign Application Priority Data

| | | |
|---|---|---|
| Dec. 24, 2020 | (CN) | 202011544830.2 |
| Dec. 24, 2020 | (CN) | 202011544833.6 |
| Dec. 24, 2020 | (CN) | 202011549714.X |
| Dec. 24, 2020 | (CN) | 202011557449.X |
| Dec. 24, 2020 | (CN) | 202023154432.8 |
| Dec. 24, 2020 | (CN) | 202023155210.8 |
| Dec. 30, 2020 | (CN) | 202011606822.6 |
| Dec. 30, 2020 | (CN) | 202023283031.2 |

(51) Int. Cl.

| | |
|---|---|
| ***G05D 1/229*** | (2024.01) |
| ***G05D 1/246*** | (2024.01) |
| ***G05D 1/248*** | (2024.01) |
| ***G05D 1/648*** | (2024.01) |
| ***G05D 105/15*** | (2024.01) |
| ***G05D 107/20*** | (2024.01) |
| ***G05D 109/10*** | (2024.01) |
| ***G05D 111/10*** | (2024.01) |
| ***G05D 111/50*** | (2024.01) |

(52) U.S. Cl.

CPC ........... *G05D 1/248* (2024.01); *G05D 1/6484* (2024.01); *G05D 2105/15* (2024.01); *G05D 2107/23* (2024.01); *G05D 2109/10* (2024.01); *G05D 2111/10* (2024.01); *G05D 2111/54* (2024.01)

(56) References Cited

U.S. PATENT DOCUMENTS

| | | | | |
|---|---|---|---|---|
| 2005/0066643 | A1 | 3/2005 | Fukushima et al. | |
| 2013/0282224 | A1 | 10/2013 | Yazaki et al. | |
| 2016/0091898 | A1 | 3/2016 | Booher | |
| 2016/0100522 | A1* | 4/2016 | Yamauchi | G05D 1/0219 701/25 |
| 2017/0248956 | A1* | 8/2017 | Tang | G05D 1/028 |
| 2017/0357262 | A1 | 12/2017 | Dix et al. | |
| 2018/0368312 | A1 | 12/2018 | Strang | |
| 2019/0265725 | A1 | 8/2019 | Shao et al. | |
| 2019/0369620 | A1* | 12/2019 | Zhou | G05D 1/2464 |
| 2020/0191973 | A1 | 6/2020 | Ohrlund et al. | |
| 2020/0236846 | A1 | 7/2020 | Choi et al. | |
| 2021/0000009 | A1 | 1/2021 | Yu et al. | |
| 2021/0064043 | A1* | 3/2021 | Kulkarni | G05D 1/028 |
| 2021/0161067 | A1* | 6/2021 | Ko | G05D 1/243 |
| 2024/0103545 | A1* | 3/2024 | Chen | G05D 1/6484 |

FOREIGN PATENT DOCUMENTS

| | | | | | |
|---|---|---|---|---|---|
| CN | 105955267 | A | | 9/2016 | |
| CN | 107608341 | A | * | 1/2018 | G05D 1/02 |
| CN | 107960191 | A | | 4/2018 | |
| CN | 108332979 | A | * | 7/2018 | G01M 17/007 |
| CN | 108490932 | A | | 9/2018 | |
| CN | 109270936 | A | | 1/2019 | |
| CN | 109952857 | A | | 7/2019 | |
| CN | 111010975 | A | | 4/2020 | |
| CN | 108592903 | B | | 1/2021 | |
| CN | 112393737 | A | * | 2/2021 | G01C 21/32 |
| CN | 113625701 | A | | 11/2021 | |
| CN | 109634285 | B | | 3/2022 | |
| JP | 2018055180 | A | | 4/2018 | |
| WO | 2014106468 | A1 | | 7/2014 | |
| WO | 2019096262 | A1 | | 5/2019 | |
| WO | 2020248458 | A1 | | 12/2020 | |
| WO | 2021037116 | A1 | | 3/2021 | |

* cited by examiner 211
212
213
2132
2131

200
mower
210
positioning module
232
path planning unit
12
control module

ROBOTIC TOOL SYSTEM AND CONTROL METHOD THEREOF

TECHNICAL FIELD

The disclosure belongs to a technical field of robotic tool system, and specifically relates to a robotic mower.

BACKGROUND

Robotic tools are widely used for maintenance in a predetermined work area. For example, a robotic mower is used to mow in a predetermined working area. Generally, a boundary wire is used to define the working area, and the mower moves randomly in the working area, so that lawn in the working area is completely covered. However, this way of working will cause the mower repeatedly working in the area that has been mowed, which results in waste of electricity and low work efficiency.

In some solutions, robotic mowers may use satellite signals for navigation, but satellite signal navigation equipment has large errors and high costs.

SUMMARY

The disclosure provides a robotic tool system. The robotic tool system includes:

a robotic tool, the robotic tool being used to move in a working area and perform outdoor tasks, and a navigation control device, the navigation control device being detachably connected with the robotic tool and including:

a navigation assembly, the navigation assembly configured to receive a position signal of the robotic tool and/or the navigation control device, a planning assembly, the planning assembly configured to receive the position signal transmitted by the navigation assembly and obtain a path map of the working area by fitting according to the position signal, and a communication assembly, the navigation control device coupled to the robotic tool through the communication assembly, the communication assembly transmitting the path map to the robotic tool, the robotic tool being controlled by the navigation control device to run in the working area according to the position signal and the path map to perform corresponding outdoor tasks or return to a charger station.

In one embodiment of the disclosure, the navigation control device further includes an image collection device, the image collection device is configured to collect an environmental image signal, and the environmental image signal includes at least a panoramic photo of the working area.

In one embodiment of the disclosure, the navigation assembly further includes an image processing module coupled to the image collection device, and the image processing module is configured to receive and process the environmental image signal.

In one embodiment of the disclosure, the planning assembly includes a data processing unit and a path planning unit. The data processing unit is respectively coupled to the navigation assembly and the communication assembly, the data processing unit obtains the position signal and the environmental image signal in real time during a movement of the robotic tool and/or the navigation control device through the navigation assembly, so as to obtain the path map by fitting and be capable of correcting the path map.

In one embodiment of the disclosure, the path planning unit is respectively connected with the data processing unit and the communication assembly. The path planning unit is configured to calibrate a marking reference in the path map and set marked reference coordinates. The data processing unit marks on obstacles in the path map through the marking reference and the marked reference coordinates, and the path planning unit can further set a boundary of the working area and/or a path for the robotic tool to return to a set position for charging on the path map.

In one embodiment of the disclosure, the navigation assembly includes a receiving module. The receiving module is capable of receiving the position signal, and the position signal includes a driving trajectory path and position coordinates of the robotic tool and/or the navigation control device.

In one embodiment of the disclosure, the robotic tool system further includes a position collection device. The position collection device includes: an information collection module and a control module;

the information collection module is configured to collect current coordinate information of the position collection device, the information collection module includes a timing mode to collect the coordinate information at a time interval, an interval mode to collect the coordinate information at a distance interval, and a manual mode to collect the coordinate information triggered by a user, the control module is configured to control the information collection module to work in one of the timing mode, the interval mode, and the manual mode or a combination thereof according to a received instruction.

In one embodiment of the disclosure, the information collection module includes:

a position collection unit, configured to collect the coordinate information of the position collection device, a timing trigger unit, configured to trigger the position collection unit to work at the time interval, and an interval trigger unit, configured to trigger the position collection unit to work at the distance interval.

In one embodiment of the disclosure, the interval trigger unit includes a mileage sensor to sense a traveling distance of the position collection device.

In one embodiment of the disclosure, the position collection device further includes:

a navigation module, preset with a navigation map, a traveling module, configured to drive the position collection device to travel, and an interaction module, a boundary line of a plot area being marked on the navigation map through the interaction module, the control module controls the traveling module to work and collects the coordinate information along the boundary line under a guidance of the navigation module.

In one embodiment of the disclosure, the position collection device further includes a partition module to divide the boundary line into a straight line area and a curve area;

when the position collection device enters the straight line area, the control module controls the position collection device to work in the timing mode, and the time interval of the timing mode at this time is T1;

when the position collection device enters the curve area, the control module sets the time interval of the timing mode to be T2, where T1>T2.

In one embodiment of the disclosure, the position collection device further includes a partition module to divide the boundary line into a straight line area and a curve area, when the position collection device enters the straight line area, the control module controls the position collection device to work in the interval mode, and the distance interval of the interval mode is S1, when the position collection device enters the curve area, the control module sets the distance interval of the interval mode to be S2, where S1>S2.

In one embodiment of the disclosure, the position collection device further includes a map generation module. The map generation module is configured to generate an accurate boundary curve of the plot area according to the coordinate information and fit the accurate boundary curve into a map of the plot area.

In one embodiment of the disclosure, the map generation module judges whether the accurate boundary curve is a closed curve. If yes, the map generation module fits the accurate boundary curve into the map of the plot area. If not, the map generation module sends out a prompt message to remind a user to complete a collection of the coordinate information of the plot area.

In one embodiment of the disclosure, the position collection device further includes a boundary recognition module to recognize a lawn boundary. When a distance between a boundary recognized by the boundary recognition module and the boundary line on the navigation map is less than a threshold, the control module controls the traveling module to work, so that the position collection device moves to the boundary recognized by the boundary recognition module.

In one embodiment of the disclosure, the boundary recognition module includes an image generation unit to capture an image of an area near the position collection device and an image recognition unit to analyze the image captured by the image generation unit to identify the lawn boundary.

In one embodiment of the disclosure, the robotic tool includes a self-propelled module for driving the robotic tool to self-propelled and a mowing module for performing a mowing function of the robotic tool. The mowing module is provided with a first working mode and a second working mode, and a control method of the robotic tool includes the following operations:

performing, by the robotic tool, self-propelled mowing in a working area in the first working mode, recording, by the robotic tool, the working area where the mowing has been completed in the first working mode and marking as a mowed area, controlling, by, the robotic tool, the mowing module to self-propelled in the second working mode when the robotic tool enters the mowed area again.

In one embodiment of the disclosure, the method further includes following operation:

marking a working area except the mowed area as an unmowed area, and controlling, by the robotic tool, the mowing module to perform self-propelled mowing in the first working mode when the robotic tool enters the unmowed area.

In one embodiment of the disclosure, the first working mode is a normal mowing mode, and the second working mode is a stop mowing mode.

In one embodiment of the disclosure, the robotic tool further includes a positioning module for providing position information of the robotic tool, the mowed area is marked through the positioning module, and the positioning module is an RTK (real-time kinematic) positioning module.

In one embodiment of the disclosure, the robotic tool further includes a camera module for recognizing a mowed state of the lawn and the mowed area is marked through the camera module.

In one embodiment of the disclosure, when power of the robotic tool is insufficient, the robotic tool is controlled to return to the charger station and a return point of the robotic tool is recorded. After charging is completed, the robotic tool returns to the return point and continues to move along an original path.

In one embodiment of the disclosure, operations of defining a working area map of the robotic tool (also called as a robotic mower) includes controlling the robotic mower to move along a boundary line of a plot area, and collecting and storing a position of the boundary line of the plot area to obtain the working area map.

In one embodiment of the disclosure, controlling the robotic mower to move along the boundary line of the plot area, and collecting and storing the position of the boundary line of the plot area to obtain the work area map includes:

collecting current position information, evaluating a path between the current position and a next position to obtain path information, determining a position collection working mode from the current position to the next position according to the path information, wherein, the position collection working mode includes at least one of a fixed period collection mode, a fixed distance collection mode, or a manual mode.

In one embodiment of the disclosure, a method for obtaining a path map set includes: respectively planning path maps of the robotic mower when moving along different travel angles in the working area according to the working area map of the robotic mower to form the path map set.

The disclosure further provides a control method for controlling the robotic mower to be connected with a power supply device for charging. The control method includes following operations:

marking a first marking line, amounting an auxiliary positioning device on the power supply device, and marking the first marking line through the auxiliary positioning device, marking a first position, connecting the robotic mower with the power supply device for charging, marking and obtaining data of the first position to indicate that the robotic mower and the power supply device are in a charging state through the auxiliary positioning device, marking a second marking line, the second marking line extending perpendicular to the first marking line, and a starting point of the second marking line being the first position, marking a preset direction and a second position, arranging the robotic mower at a position having a preset length away from the power supply device along the second marking line and where a charging port for charging the robotic mower being located on the second marking line, sampling the position as data of the second position, and the second position forming the preset direction toward the first position, the robotic mower recognizing the second position, moving from the second position to the first position along the preset direction, and realizing a charging connection between the robotic mower and the power supply device.

The disclosure further provides a control method for controlling the robotic mower to move and work according to a selected path map. The control method includes following operations:

obtaining current position information of a mower (also called as the robotic mower) in the working area, judging whether the mower deviates from the path map according to the current position information and the selected path map, and determining a deviation between the current position and the path map, determining that a missing mowing area occurs when the deviation is greater than a preset threshold value, mowing the missing mowing area after the missing mowing area determined.

The disclosure further provides a control method for controlling the robotic mower to move and work according to a selected path map. The control method includes:

adjusting a forward direction of the mower to enable the mower to return to the path map after determining that the mower deviates from the path map.

The disclosure further provides a control method for controlling the robotic mower to move and work according to a selected path map. The control method includes:

marking the working area except the mowed area as an unmowed area, and when the mower enters the unmowed area, the mower controlling the mowing module to perform self-propelled mowing in the first working mode.

The disclosure further provides an auxiliary positioning device. The auxiliary positioning device is arranged in cooperation with the charger station. The auxiliary positioning device is configured to calibrate a preset position and a preset direction. The preset position includes a first position where the robotic mower is in connected with the charger station for charging and a second position arranged apart from the first position. The second position forms the preset direction toward the first position. The robotic mower may recognize the second position, and move from the second position to the preset first position along the preset direction to realize a charging connection with the charger station.

In one embodiment of the disclosure, the auxiliary positioning device is arranged in a plate shape with a matching part for matching the charger station and an extension part extending outward from the matching part. The first position is marked on the matching part, the second position is marked on the extension part, and when the auxiliary positioning device is matched with the charger station, the first position, a charging electrode plate of the charger station, and the second position are located on a same straight line.

The disclosure further provides a method of controlling a robotic tool with a detachably navigation control device, the methods includes controlling the navigation control device move along a boundary of a working area;

collecting coordinate information of the boundary;

fitting the coordinate information to generate a boundary map;

sending the boundary map to the robotic tool;

controlling the robotic tool to work within the boundary.

In one embodiment of the disclosure, the method further includes: marking coordinate information of obstacles within the boundary.

In one embodiment of the disclosure, the method further includes: calculating to generate a working path so that the working path covers all working areas and avoids obstacles.

In one embodiment of the disclosure, when boundary information is collected, the information is collected at a time interval or a distance interval.

In one embodiment of the disclosure, the time interval or the distance interval is adjustable.

The robotic mower in the disclosure will first randomly select a path map from a pre-stored path map set (a path of each path map is different) each time it runs, and then follow the selected path map to move and work, thereby avoiding repeatedly rolling of lawn or vegetation, which can better protect the lawn or the vegetation.

The disclosure realizes the charging connection of the robotic mower and the power supply device, which effectively improves convenience of use of the robotic tool system of the disclosure. At the same time, the operations of a control method of the robotic tool of the robotic tool system provided by the disclosure are simple and suitable for popularization.

The mower of the disclosure can automatically adjust a traveling direction of the mower when it deviates from a planned path to perform a supplementary mowing on the missing mowing area, thereby reducing labor intensity of an operator.

The mower of the disclosure can control a working state of the mowing module of the mower according to whether a mowing in the working area is completed, thereby effectively saving power and extending working time of the mower.

BRIEF DESCRIPTION OF THE DRAWINGS

In order to explain technical solutions of embodiments of the disclosure more clearly, the following will briefly introduce drawings used in the description of the embodiments. Obviously, the drawings in the following description are only some embodiments of the disclosure. For those of ordinary skill in the art, other drawings may be obtained based on these drawings without creative work.

FIG. 33 is a flowchart of supplementary mowing of the missing mowing area.

DETAILED DESCRIPTION

Figure 1:
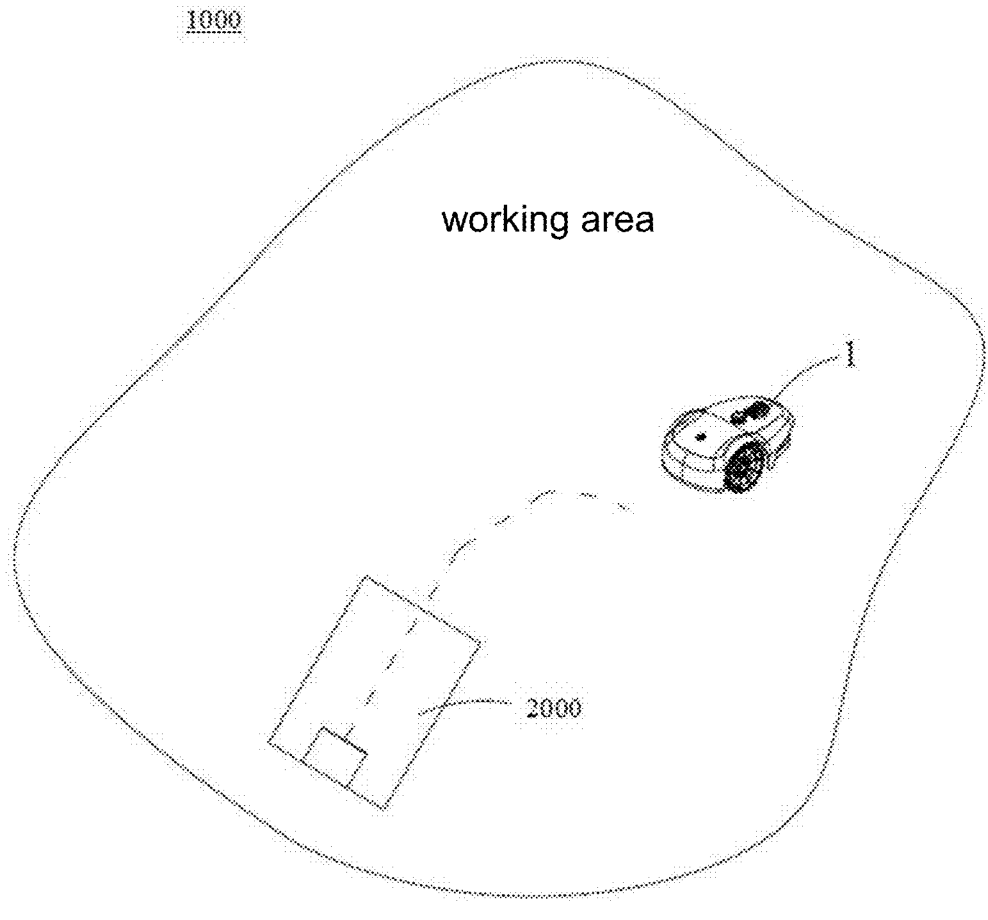
FIG. 1 is a structural schematic view of a robotic tool system of the disclosure.
Figure 2:
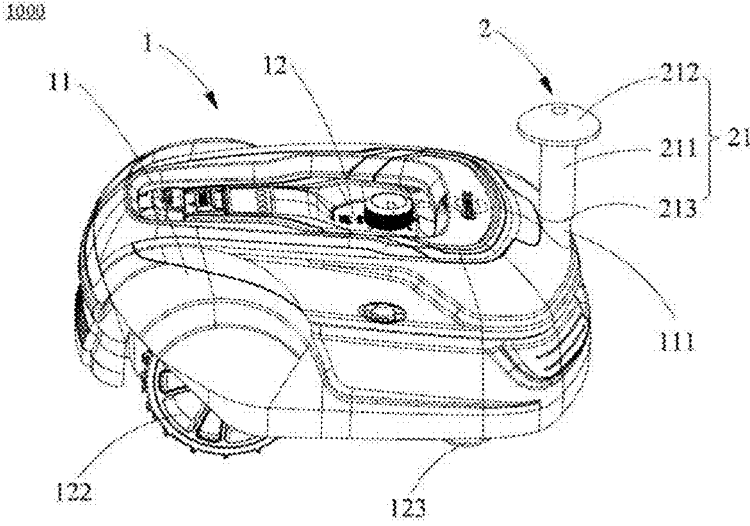
FIG. 2 is a structural schematic view when the robotic tool is mounted with a navigation control device.
Figures 3, 4:
FIG. 3 is a disassembly schematic view when the robotic tool and the navigation control device are disassembled.
FIG. 4 is a structural schematic view of the navigation control device in FIG. 2 from another angle.

The following describes the implementation of the disclosure through specific embodiments, and those skilled in the art can easily understand other advantages and effects of the disclosure from the content disclosed in this specification. The disclosure may also be implemented or applied through other different specific embodiments. Various details in this specification may also be modified or changed based on different viewpoints and applications without departing from the spirit of the disclosure.

It should be noted that figures provided in these embodiments only illustrate a basic idea of the disclosure in a schematic manner. The figures only show the assemblies related to the disclosure instead of drawing according to number, shape and size of the assemblies in actual implementation. In its actual implementation, type, quantity, and ratio of each assembly may be changed at will, and its assembly layout type may also be more complicated.

In order to save time of mowing operation and improve the efficiency of mowing, the robotic mower usually moves through an optimized path map, so that each mowing operation squeezes the lawn or vegetation along a same movement path, thereby destroying the growth of lawn or vegetation in the rutting area. In order to solve this problem, the disclosure provides a robotic tool system and a control method of a robotic tool. Each time the robotic mower runs, it will first randomly select a path map from a pre-stored path map set (each path map has a different path), and then follow the selected path map to move and work, thereby avoiding repeated rolling of the lawn or the vegetation, which can better protect the lawn or the vegetation.

Please refer to FIG. 1 through FIG. 4, in this embodiment, the disclosure provides the robotic tool system 1000. The robotic tool system includes a robotic mower 1 (also called as an robotic tool) and a navigation control device 2 detachably connected with the robotic mower 1. The navigation control device 2 is configured to obtain a path map of the robotic mower 1 in a working area and may plan a traveling path of the robotic mower 1 in the working area.

Please refer to FIG. 1 through FIG. 6, the robotic mower 1 is configured to move in the working area and perform outdoor tasks. In the disclosure, the robotic mower 1 includes a casing 11, a control module 12 housed in the casing 11, a power supply unit 13, and a working module 14 for performing outdoor work.

Please refer to FIG. 1 through FIG. 6. Specifically, the casing 11 is provided with a housing space (not shown). The control module 12 is configured to control the robotic mower 1 to run and work. The control module 12 includes a control circuit board (not shown) housed in the housing space of the casing 11, a driving motor 121, a driving wheel 122 located behind the casing 11, and at least one driven wheel 123 located in front of the casing 11.

Please refer to FIG. 1 through FIG. 6. Further, there are at least two driving motors 121. The driving motors 121 includes a first driving motor (not labeled) for driving the driving wheel 122 and a second driving motor (not labeled) for driving the working module 14. In some embodiments, the robotic mower 1 is provided with two driving wheels 122 located behind the casing 11 and two first driving motors arranged in correspondence with the driving wheels 122, and the driven wheel 123 is a caster.

Please refer to FIG. 1 through FIG. 6. The power supply unit is housed in the housing space to supply power for the robotic mower 1. And in the embodiment, the power supply unit 13 is a rechargeable power supply unit detachably connected with the robotic mower 1, so as to facilitate the power supply unit 13 to be charged or replaced. Of course, in other embodiments of the disclosure, the power supply unit 13 may also be fixedly connected with the robotic mower 1. At this time, the power supply unit 13 may be charged through a charger station. The power supply unit 13 is a rechargeable battery pack.

Please refer to FIG. 1 through FIG. 6. The working module 14 is connected and mounted on the casing 11 and is drivingly connected with the second driving motor. In the disclosure, the working module 14 may be any outdoor working unit for performing outdoor work, such as a cutting assembly for mowing or an auger assembly for performing snow removal. It should be noted that the working module 14 is detachably connected with the casing 11, which means that a connection position of the working module 14 and the casing 11 may be connected and mounted according to specific functions of the working module 14. It is only necessary to ensure that the working module 14 is connected with the driving motor 121 and outdoor tasks can be realized.

Please refer to FIG. 1 through FIG. 6. The navigation control device 2 may obtain accurate coordinates of a current position, may also receive and obtain a path map of the working area of the robotic mower 1, and may plan and obtain a driving path of the robotic mower 1 in the working area, which is convenient for the robotic mower 1 to run and be connected with a charger station 2000 for charging. Due to a high cost of the navigation control device which can accurately position, a detachable navigation control device 2 is provided, which can be used by different devices. The navigation control device 2 includes a housing 21, a navigation assembly 22 housed in the housing 21, a planning assembly 23, a communication assembly 24 and an image collection device 25.

Please refer to FIG. 1 through FIG. 6. Specifically, the housing 21 has a housing part 211 arranged in a cylindrical shape. The housing part 211 is hollow for housing the navigation assembly 22, the planning assembly 23 and the communication assembly 24. Further, one end of the housing part 211 is connected with a receiving part 212, and the other end thereof is provided with a connecting assembly 213. In an embodiment, the connecting assembly 213 includes a connecting part 2131 and a connecting terminal 2132 defined on the housing part 211. The navigation control assembly 2 is detachably connected with the robotic mower 1 through the connecting part 2131, and the casing 11 is provided with a connecting structure 111 corresponding to the connecting part 2131. The connecting structure 111 is defined on the casing 11, so that the navigation control device 2 may be detachably connected with the robotic mower 1 through a matching between the connecting part 2131 and the connecting structure 111. Both the connecting part 2131 and the connecting structure 111 are arranged in a cylindrical shape, and a diameter of the connecting part 2131 is larger than a diameter of the connecting structure 111, which facilitates a connection between the navigation control device 2 and the robotic mower 1.

Please refer to FIG. 1 through FIG. 6. One end of the connecting terminal 2132 is housed in the housing part 211 to be coupled to the navigation assembly 22, the planning assembly 23, and the communication assembly 24 respectively, and the other end thereof penetrates the housing part 211 and is housed in the connecting part 2131. Specifically, the connecting structure 111 is provided with a plugging structure 112 corresponding to the connecting terminal 2132, and the plugging structure 112 is respectively connected with the control module 12 and the power supply unit 13. And when the navigation control device 2 is connected with the robotic mower 1, the connecting terminal 2132 is plugged into the plugging structure 112, which realizes a matching between the navigation control device 2 and the robotic mower 1. In one embodiment, the plugging structure 112 at least includes a power supply plugging structure (not shown) connected with the power supply unit 13 and a signal plugging structure (not shown) connected with the control module 12. The connecting terminal 2131 includes a power supply plugging terminal and a signal plugging terminal respectively corresponding to the power supply plugging structure and the signal plugging structure.

Please refer to FIG. 1 through FIG. 6. The navigation assembly 22 is configured to receive a position signal and an environmental image signal of the robotic mower 1 and/or the navigation control device 2. The navigation assembly 22 is an assembly that may obtain the path map of the robotic mower 1 in the working area through real-time kinematic (RTK) technology, and the navigation assembly 22 may monitor a position of the navigation control device 2 and/or the robotic mower 1 in real time to prevent the robotic mower 1 from moving outside the working area. At the same time, it is convenient for the navigation control device 2 to control the robotic mower 1 to move along a planned path in the path map through the control module 12.

Please refer to FIG. 1 through FIG. 6. Since the navigation assembly 22 in the disclosure is a position control assembly with RTK technology, the navigation assembly 22 of the disclosure can obtain three-dimensional position coordinates of the robotic mower 1 and/or the navigation control device 2 during a movement according to a satellite and a position base station in real time, compose differential observations in the navigation assembly 22 for real-time processing, and further give a positioning result in a centimeter level, so that it is convenient to monitor the position of the robotic mower 1 and/or the navigation control device 2 in real time.

Please refer to FIG. 1 through FIG. 6. In the disclosure, the navigation assembly 22 includes a receiving module 221 and an image processing module 222 connected with the receiving module 221. The receiving module 221 is configured to receive the position signal of the robotic mower 1 and/or the navigation control device 2. In the disclosure, the position signal includes a trajectory path of the robotic mower 1 and/or the navigation control device 2 and position coordinates (three-dimensional position coordinates) of each point in the trajectory path.

Please refer to FIG. 1 through FIG. 6. Further, the receiving module 221 is housed in the housing part 211 and located in the receiving part 212. In an embodiment of the disclosure, the receiving part 212 is disc-shaped. With this arrangement, it may effectively improve an receiving/sending effect of receiving and/or sending position information by the receiving module 221.

Please refer to FIG. 1 through FIG. 6. The image processing module 222 is connected with the image collection device 25 for receiving an environmental image signal of the working area obtained by the image collection device 25. In the disclosure, the environmental image signal includes at least a panoramic photo of the working area. After the image processing module 222 receives the environmental image signal, the image processing module 222 may further receive and process the environmental image signal through the receiving module 221. Further, the panoramic photo is obtained by fitting multiple terrain images in the working area obtained by the robotic mower 1 through the receiving module 221, and the panoramic photo includes at least a relative height (which means altitude) of each position in the working area. In this way, accuracy of the path map obtained by the navigation control device 2 by fitting may be further improved. The planning assembly 23 is configured to receive the position signal and the environmental image signal transmitted by the navigation assembly 22, and obtain the path map of the working area according to the position signal and the environmental image signal. In the disclosure, the planning assembly 23 includes a data processing unit 231 and a path planning unit 232. Specifically, the data processing unit 231 is respectively coupled to the navigation assembly 22 and the communication assembly 24, and obtains the position signal and the environmental image signal during a movement of the robotic mower 1 and/or the navigation control device 2 in real time through the navigation assembly 22, so as to obtain the path map by fitting and be capable of correcting the path map.

Please refer to FIG. 1 through FIG. 6. Further, the path planning unit 232 is coupled to the data processing unit 231 and the communication assembly 24 respectively. And in the disclosure, the path planning unit 232 is further configured to calibrate a marking reference in the path map and set marked reference coordinates, and the data processing unit 231 marks obstacles in the path map through the marking reference and the marked reference coordinates. In addition, the path planning unit 232 can further set a boundary of the working area and/or a path for the robotic mower 1 to return to a charger station for charging on the path map.

Please refer to FIG. 1 through FIG. 6. The path planning unit 232 is further configured to calibrate obstacles in the working area. And the obstacles that may be calibrated in the path map in the disclosure include at least a fixed obstacle, a flowing obstacle and a target obstacle. The fixed obstacle refers to an object and/or equipment that cannot be moved for a long time in the working area, and a shape, position, size and other attributes of the object and/or the equipment will not change over time, such as buildings, roads, courtyard walls, etc. located in the working area.

The flowing obstacle refers to an object and/or equipment and/or pet, pedestrian, etc. temporarily stored/staying in the working area, and a shape, position, size and other attributes of the flow obstacle will change over time, such as a car parked in the working area, a person and/or a pet playing in the working area, and a plant that is often trimmed.

The target obstacles refer to an obstacle that will not change in a short time but will change in a long time in the working area, such as bushes and so on.

Please refer to FIG. 1 through FIG. 6. The communication assembly 24 is configured to realize a communication connection between the navigation control device 2 and the robotic mower 1, which means that the navigation control device 2 transmits a corresponding path map and path planning information to the control module 12 through the communication assembly 24, and then controls the robotic mower 1 to move in the path map according to the path planning information and performs corresponding outdoor tasks.

Please refer to FIG. 1 through FIG. 6. Further, when power of the robotic mower 1 is too low, the control module 12 may also be connected with the navigation assembly 22 through the communication assembly 24, further detect and obtain a relative position between the charger station and the robotic mower 1 through the navigation assembly 22, and then control the robotic mower 1 to move to a position of the charger station according to the path map.

Please refer to FIG. 1 through FIG. 6, the charger station is arranged in the working area. The path planning unit 232 may also be configured to plan a charging return path for the robotic mower 1 to return to the charger station, so as to facilitate the robotic mower 1 to return to the charger station 2000 from various positions in the working area.

Please refer to FIG. 1 through FIG. 6. It should be noted that the communication assembly 24 communicates with the robotic mower 1 through a wired connection and/or a wireless connection such as wifi, bluetooth, infrared, etc., and when the communication assembly 24 adopts the wired connection, the communication assembly 24 is connected with the control module 12 in the robotic mower 1 through the connecting terminal. Of course, in other embodiments of the disclosure, the communication assembly 24 may also communicate with the control module 12 through other wireless connection.

Please refer to FIG. 1 through FIG. 6. Further, the navigation control device 2 further includes a power supply component 26, and the power supply component 26 is detachably connected with the navigation control device 2. With this arrangement, when the navigation control device 2 is connected with the robotic mower 1, the navigation control device 2 is connected with the power supply unit 13 through the connecting terminal. At this time, the power supply unit 13 may supply power to for navigation control device 2 while providing power to the robotic mower 1, and when the power supply component 26 is not removed from the navigation control device 2, the power supply unit 13 may also charge the power supply component 26. While when the navigation control device 2 is removed from the robotic mower 1 or mounted in another type of device that cannot supply power, the power supply component 26 may supply power for the navigation control device 2.

Please refer to FIG. 1 through FIG. 6. When using the robotic tool system, first the navigation control device 2 is driven to run in the working area through the robotic mower 1 or other mobile devices, then the position signal and environmental image signal of each position point in the working area are obtained, and further the path map of the robotic mower 1 in the working area is obtained. Further, the navigation control device 2 may also plan a running path of the robotic mower 1 in the working area. At this time, the robotic mower 1 may move in the working area according to a planned path and complete corresponding outdoor tasks.

Please refer to FIG. 1 through FIG. 6. It should be noted that, in the drawings in the disclosure, only the robotic mower 1 is an example of a robotic mower for illustration. In fact, since the navigation control device 2 is detachably connected with the robotic mower 1, the navigation control device 2 may also be applied to other types of smart outdoor tools or automatic devices to obtain path maps.

Please refer to FIG. 1 through FIG. 6. Further, the navigation control device 2 may also run independently to obtain a path map, and then realize a transmission of the path map with various types of robotic mowers 1 through the communication assembly 24, so as to control the robotic mower 1. This means that a matching between the navigation control device 2 and the robotic mower 1 in the disclosure is only exemplary, and should not be limited to this.

Please refer to FIG. 1 through FIG. 6. The robotic tool system of the disclosure is provided with the navigation control device 2 detachably connected with the robotic mower 1, and set a structure and form of the navigation control device 2, which is convenient and quick to obtain the path map of the working area of the robotic mower 1 through the navigation control device 2 and effectively improve drawing accuracy of the path map in the working area of the robotic mower 1. At the same time, a working path of the robotic mower 1 may also be planned, so that the robotic mower 1 may quickly move to the position of the charger station according to the planned path, realize an automatic charging connection between the robotic mower 1 and the charger station, and further improving practicability of the robotic tool system.

Figure 7:
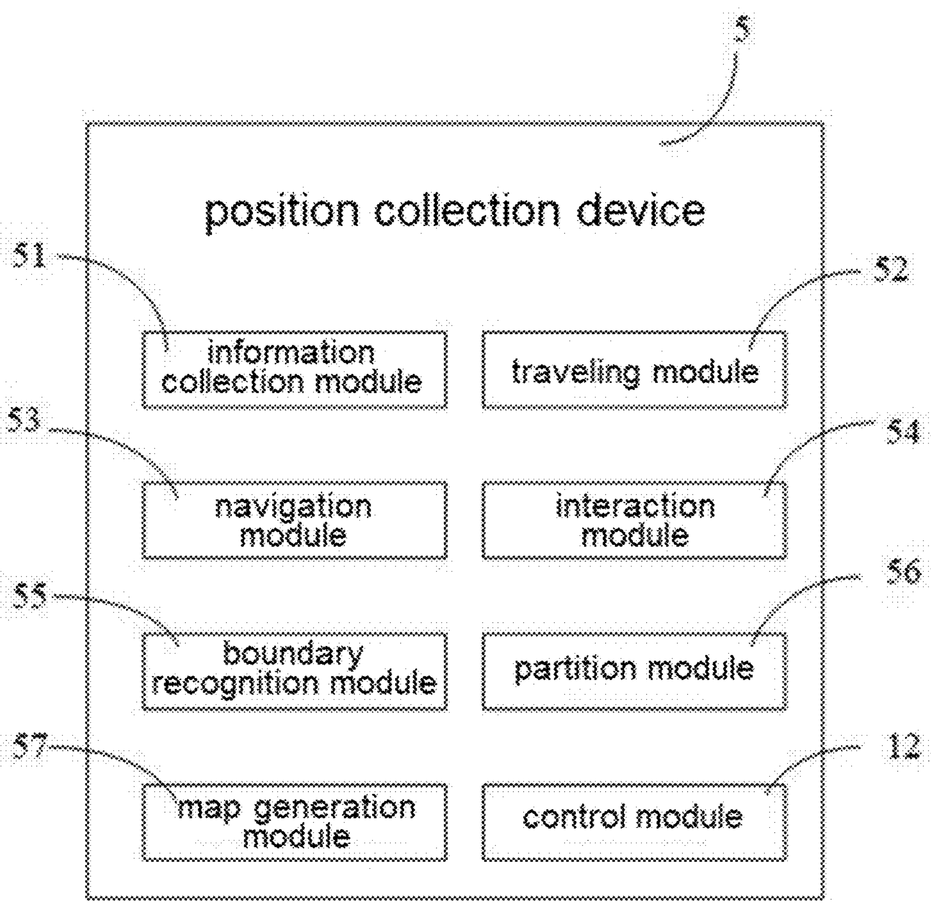
FIG. 7 is a block schematic view of a position collection device of the disclosure.

Please refer to FIG. 7, in this embodiment, the robotic tool system further includes a position collection device 5. The position collection device 5 includes an information collection module 51 for collecting current coordinate information of the position collection device 5, a traveling module 52 for driving the position collection device 5 to move, a navigation module 53, an interaction module 54, and a boundary recognition module 55, a partition module 56, a map generation module 57, and the control module 12 mentioned above. The traveling module 52 is configured to drive the position collection device 5 to move. In this embodiment, the position collection device 5 is mounted on the robotic mower 1, which means that the traveling module 52 is also configured to drive the robotic mower 1, and includes the driving motor 121, the driving wheels 122 located behind the casing 11, and at least one driven wheel 123 located in the front of the casing 11 mentioned above. The position collection device 5 may be a navigation control device 2, which means that the position collection device 5 may not only be mounted on the robotic mower 1 for use, but also be disassembled to collect a position separately.

Figure 8:
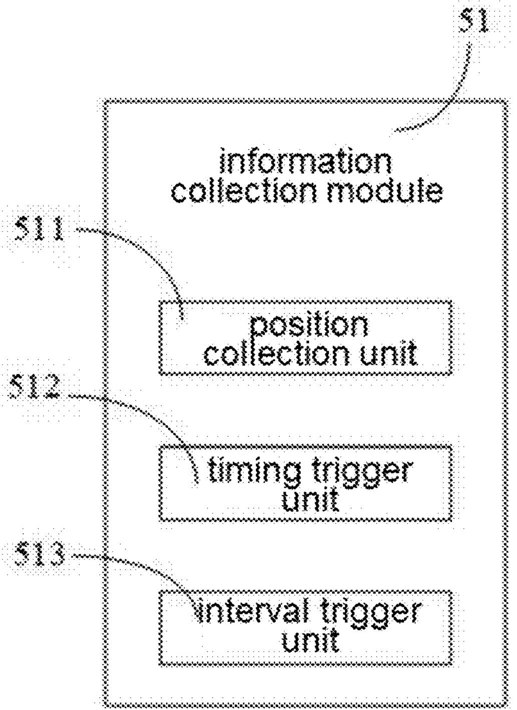
FIG. 8 is a block schematic view of a position collection module.
Figure 9:
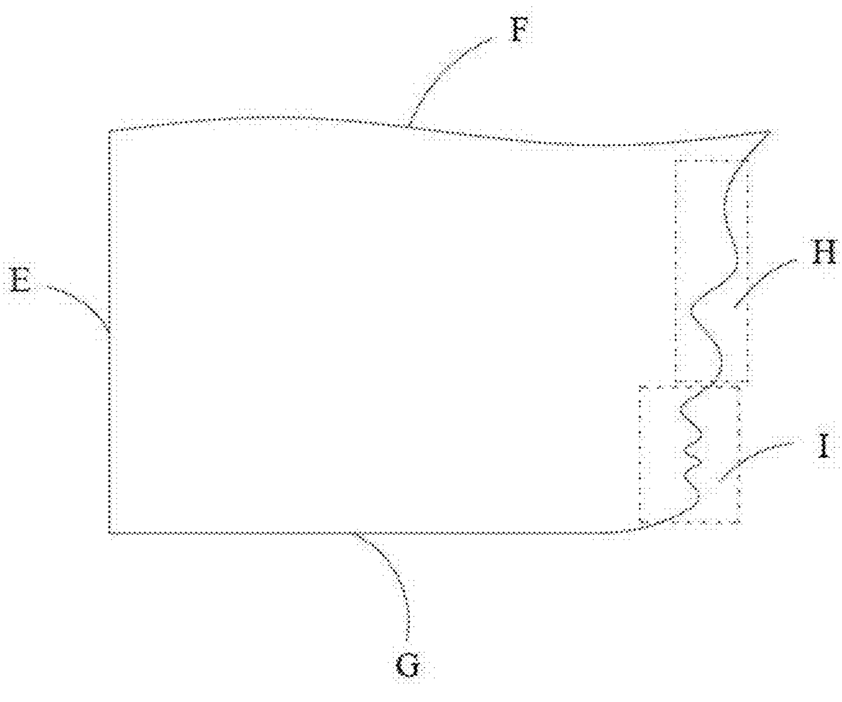
FIG. 9 is a schematic view of a boundary of a plot area.
Figure 10:
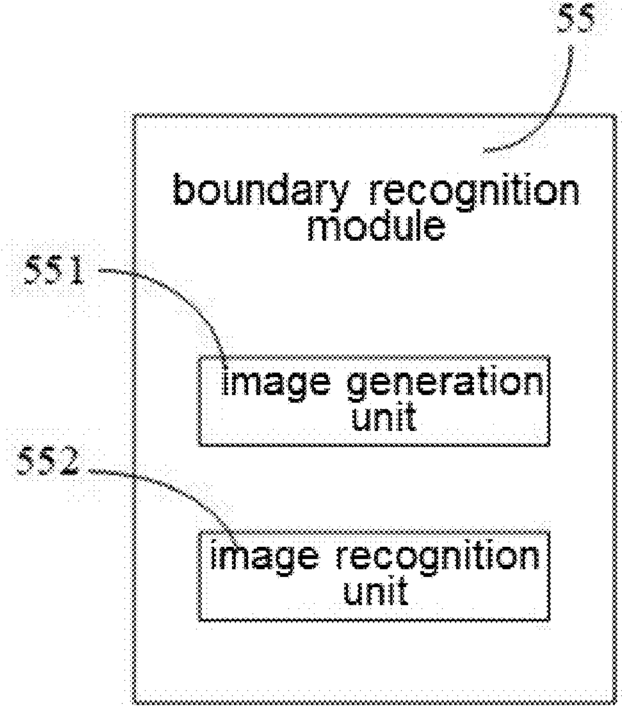
FIG. 10 is a block schematic view of a boundary recognition module.

Please refer to FIG. 7 and FIG. 8. A working mode of the information collection module 51 includes a timing mode for collecting the coordinate information at a time interval, an interval mode for collecting the coordinate information at a distance interval, and a manual mode for collecting the coordinate information triggered by a user. Specifically, the information collection module 51 includes a position collection unit 511 for collecting current coordinate information of the position collection device 5, a timing trigger unit 512 for trigging the position collection unit 511 to work at the time interval, and an interval trigger unit 513 for trigging the position collection unit 511 to work at the distance interval. In this embodiment, the coordinate information refers to coordinates of a center point of the position collection unit 511, and the position collection unit 511 is an RTK (real time kinematic) positioning module, so as to obtain accurate coordinate information of the position collection device 5. The timing trigger unit 512 controls the position collection unit 511 to work every time T to collect current coordinate information of the position collection device 5. The interval trigger unit 513 controls the position collection unit 511 to work every distance S to collect the current coordinate information of the position collection device 5. The interval trigger unit 513 includes a mileage sensor (not shown) for sensing a movement distance of the position collection device 5. The mileage sensor may be a roller counter, a photoelectric odometer, or the like. When the timing trigger unit 512 is working, the information collection module 51 is in the timing mode. When the interval trigger unit 513 is working, the information collection module 51 is in the interval mode. When the timing trigger unit 512 and the interval trigger unit 513 are not working, the information collection module 51 is in a manual mode. At this time, the user is required to manually control the position collection unit 511 to collect the coordinate information. Since the information collection module 51 has three working modes, the user can select a corresponding working mode to work according to a degree of curvature of the boundary line of the plot area. For example, FIG. 9 shows a boundary map of a lawn area. Boundary lines E, F, G are straight lines or approximate straight lines, and the user can choose to work in the manual mode, the timing mode, or the interval mode. When the timing mode or the interval mode is selected, a time interval or distance interval may be set to be larger, thereby reducing an amount of data collection and reducing a burden of data processing. Boundary lines H and I are curves, and the user can choose to work in the timing mode or the interval mode. When selecting the timing mode or the interval mode, the time interval and distance interval are needed to be set to be smaller to increase the amount of data collection, so as to facilitate a generation of an accurate boundary curve.

Please refer to FIG. 7 through FIG. 10, a GPS navigation map is preset in the navigation module 53 to guide the traveling module 52 to move. The interaction module 54 is configured to display the navigation map, the coordinate information, etc., and can be configured for the user to input instructions. The interaction module 54 may be a touch screen, or may be include a display screen, a keyboard, and a mouse. The user can mark a boundary line of the plot area on the navigation map through the interaction module 54 so that the navigation module 53 automatically guides the position collection device to move to a designated plot area for coordinate information collection. The boundary recognition module 55 is configured to recognize a boundary of the lawn, and includes an image generation unit 551 for capturing an image of an area near the position collection device 5 and an image recognition unit 552 that analyzes the image obtained by the image generation unit 551 to recognize the boundary of the lawn. When a distance between a boundary recognized by the boundary recognition module 55 and the boundary line on the navigation map is less than a threshold, the control module 12 controls the traveling module 52 to work, so as to enable the position collection device 5 to move to the boundary recognized by the boundary recognition module 55, so that the position collection device 5 may collect accurate coordinate information of an actual boundary line of the plot area. When the distance between the boundary recognized by the boundary recognition module 55 and the boundary line on the navigation map is greater than the threshold, the control module 12 controls the traveling module 52 to move along the boundary line on the navigation map. The threshold may be set by the user as needed.

Please refer to FIG. 7, the partition module 56 is configured to divide the boundary line on the navigation map into an approximate straight line area and a curve area. When the position collection device 5 enters the approximately straight line area, the control module 12 controls the position collection device 5 to work in the timing mode, and a time interval of the timing mode is T. When the position collection device 5 enters the curve area, the control module 12 sets the time interval of the timing mode to be T2. Wherein, T1 is greater than T2. For example, please refer to FIG. 9. The boundary lines E and G are straight lines, and the boundary line F is an approximate straight line. A time interval for collecting coordinate information may be lengthened. In this way, it can not only reduce the amount of data collection, thereby reducing the burden of data processing, but also does not affect accuracy of the boundary line fitted according to the coordinate information. The boundary lines H and I are curves, and a degree of curvature of the boundary line H is greater than a degree of curvature of the boundary line I. The time interval for collecting coordinate information needs to be shortened to avoid affecting the accuracy of the boundary line fitted according to the coordinate information. In some embodiments, a time interval when the boundary line H is collected is greater than a time interval when the boundary line I is collected. Of course, it is understandable that the position collection device 5 may also be configured as: when the position collection device 5 enters the approximately straight line area, the control module 12 controls the position collection device 5 to work in the interval mode, and a distance interval of the interval mode is L1, when the position collection device 5 enters the curve area, the control module 12 sets the distance interval of the interval mode to L2. Wherein, L1 is greater than L2. In this embodiment, when the position collection device 5 is located in the approximately straight line area or the curved area, the position collection device 5 works in the timing mode or the interval mode, in other embodiments, the position collection device 5 works in the timing mode in the approximately straight line area and works in the interval mode in the curved area, or works in the interval mode in the approximately straight line area and works in the timing mode in the curved area.

Please refer to FIG. 7, the map generating module 57 fits and generates an accurate boundary curve of the plot area according to the coordinate information collected by the position collection device 5, so as to fit and generate an accurate navigation map of the plot area. The map generation module 57 determines whether the accurate boundary curve is a closed curve. If yes, the map generation module 57 fits the accurate boundary curve into the map of the plot area. If not, the map generation module 57 sends out a prompt message to remind the user to complete a collection of the coordinate information of the plot area. The control module 12 controls the information collection module 5 to work in one of the timing mode, the interval mode, or the manual mode or a combination thereof according to a received instruction. The instruction may be issued by the user, or may be issued by the partition module 56.

Of course, in other embodiments, the position collection device 5 may also be provided with a wireless communication module (not shown), so as to send the coordinate information collected by the position collection device 5 to other device such as a server, for data processing by other device. Alternatively, the position collection device 5 directly processes data, fits and generates the accurate navigation map, and then sends the accurate map to a third device, such as a mower, through the wireless communication module.

The position collection device 5 of the disclosure can collect the coordinate information of the boundary line of the plot area through a combination of one or more working modes, thereby facilitating a data processor to fit and generate the accurate boundary curve and the navigation map.

Figure 11:
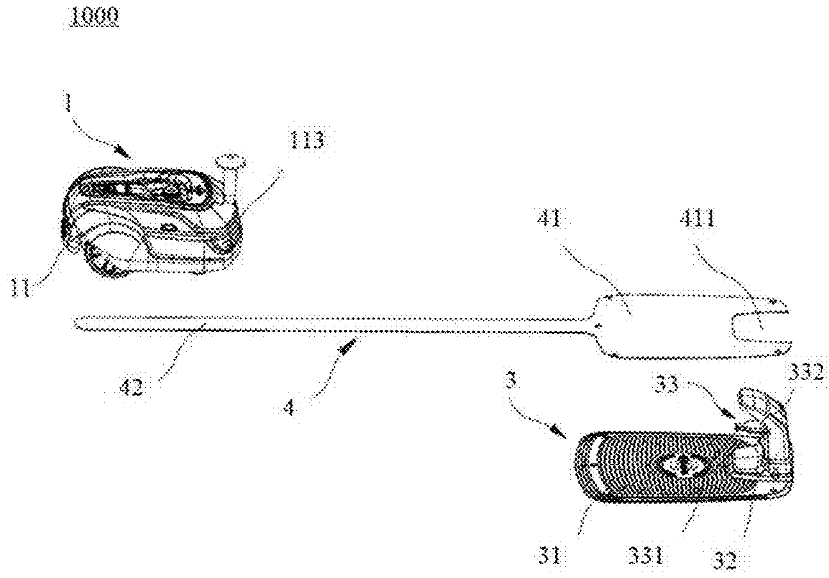
FIG. 11 is another structural schematic view of the robotic tool system of the disclosure.
Figure 12:
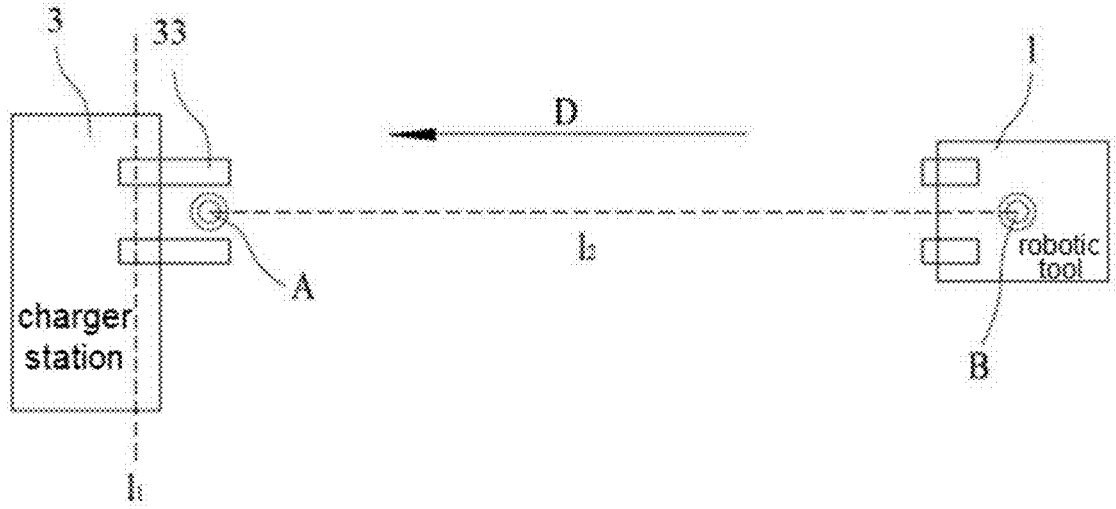
FIG. 12 is a schematic view of the robotic tool system of the disclosure correcting the second position.

Please refer to FIG. 11, in this embodiment, the robotic tool system further includes a charger station 3 for charging the robotic mower 1 and an auxiliary positioning device 4. The robotic mower 1 may autonomously search and move to a position of the power supply device 3 for charging connection under a guidance of the auxiliary positioning device 4.

Please refer to FIG. 11, the robotic mower 1 includes a rechargeable battery assembly (not shown) housed in the casing 11, and the control module 12 (not shown) connected with the battery assembly and the working module 14.

Please refer to FIG. 11, a charging port 113 is arranged on one side of the casing 11, and a charging power terminal (not shown) corresponding to the power supply device 3 is arranged in the charging port 113. Further, the control module 12 is provided with a navigation recognition component for recognizing an operation position of the robotic mower 1 and a relative position between the robotic mower 1 and the power supply device 3.

In an embodiment of the disclosure, the navigation recognition component is a control component that may control the robotic mower 1 through real-time kinematic (RTK) technology to automatically find the power supply device 3. In other embodiments of the disclosure, the navigation recognition component may also be a control component configured to perform other technologies. It only needs to ensure that the control component may control the robotic mower 1 to recognize its operation position and charging position and complete an automatic charging connection with the power supply device 3.

Please refer to FIG. 11, the power supply device 3 provides a charging power for the robotic mower 1. In the disclosure, the power supply device 3 includes a bottom plate 31 and a power supply port 32 arranged at one end of the bottom plate 31. Specifically, the bottom plate 31 is arranged in a horizontal plate shape. The power supply port 32 is arranged on an edge of the bottom plate 31 and extends upward from the edge of the bottom plate substantially perpendicular to the bottom plate 31. Furthermore, a charging electrode plate 33 is arranged on a side of the power supply port 32 close to the bottom plate 31.

Please refer to FIG. 11, specifically, the charging electrode plate 33 is arranged in a middle of the power supply port 32 parallel to the bottom plate 31, and the charging electrode plate 33 is arranged corresponding to the charging power terminal. In this embodiment, the charging electrode plate 33 includes a first part 331 arranged at a front end of the charging electrode plate 33 in extension direction to be plugged and connected with the charging power terminal, and a second part 332 arranged at a rear end of the charging electrode plate 33 in the extension direction. And a width of the first part 331 is smaller than a width of the second part 332, so that the charging electrode plate 33 may be inserted into the charging port 113 of the robotic mower 1 to mechanically match the charging power terminal arranged in the charging port 113, in order to realize the charging connection between the robotic mower 1 and the power supply device 3.

Please refer to FIG. 11, the auxiliary positioning device 4 is matched with the power supply device 3 to assist the robotic mower 1 and the power supply device 3 to be correctly connected.

Please refer to FIG. 11, in the disclosure, the auxiliary positioning device 4 is in a plate shape, and is provided with a matching part 41 matched with the power supply device 3 and an extension part 42 connected with the matching part 41. Specifically, the auxiliary positioning device 4 is clamped on the bottom plate 31 during use, and the matching part 41 has substantially a same shape as the bottom plate 31. Further, the matching part 41 is provided with a groove 411 for housing the power supply port 32 and the auxiliary positioning device 4 is clamped and positioned on the bottom plate 31 through the groove 411. Further, the extension part 42 extends outward from an edge of the matching part 41, and an extension direction of the extension part 42 is the same as that of the charging electrode plate 33.

A position of which the robotic mower 1 may recognize and control the robotic mower to turn to realize charging plug-in is defined as a preset position. A direction in which the robotic mower 1 moves from one preset position to another preset position to achieve charging and plugging with the power supply device 3 is defined as a preset direction. In this way, the auxiliary positioning device 4 may be configured to calibrate the preset position and the preset direction.

The preset positions in this embodiment include a first position A in which the robotic mower 1 connects with the power supply device 3 for charging, and a second position B that is spaced apart from the first position A. The second position B faces the first position A to define a preset direction D. Wherein, the first position A is configured to indicate that the robotic mower 1 and the power supply device 3 are in a charging state. The second position B is configured to indicate a rotating position of the robotic mower 1 that may be turned to realize the charging connection between the robotic mower 1 and the power supply device 3.

Further, the first position A is calibrated on the matching part 41, and the second position B is calibrated on the extension part 32. And when the auxiliary positioning device 4 is matched with the power supply device 3, the first position A, the charging electrode plate 33 of the power supply device 3 and the second position B are located on a same straight line. When the auxiliary positioning device 4 is matched with the power supply device 3, and the robotic mower 1 is connected with the power supply device 3 for charging, the first position A, the charging power terminal of the robotic mower 1, the charging electrode plate 33 of the power supply device 3, and second position B are on the same straight line.

Specifically, the navigation recognition component may be configured to recognize the preset positions and the preset directions, which means that in this embodiment, the navigation recognition component may recognize the first position A, the second position B, and the preset direction D. When power of the robotic mower 1 is low and the robotic mower 1 needs to be charged, the control component controls the navigation recognition component to start working. The navigation recognition component controls the robotic mower 1 to search and move to the second position B, and turn at the second position B, so that the robotic mower 1 moves from the second position B to the preset first position A along the preset direction D, and finally the charging connection between the robotic mower 1 and the power supply device is realized.

In fact, since the navigation recognition component uses RTK navigation positioning, the navigation recognition component may recognize an orientation of the power supply device 3 after controlling the robotic mower 1 to find the power supply device 3, so that the charging port 113 may be aligned with the power supply port 32 to realize plugging and charging. Further, since the first position A, the second position B and the charging electrode plate 33 of the power supply port 32 are in the same straight line, when the robotic mower 1 finds the second position B, the orientation of the power supply device 3 may be determined along the preset direction D. Furthermore, the robotic mower 1 may be accurately moved and correctly connected with the power supply device 3 for charging, which further improves accuracy and stability of the robotic mower 1 connected with the power supply device 3 for charging.

In another embodiment of the disclosure, there are a plurality of the second position B, and the plurality of second positions B are all located on the same straight line as the first position A. Further, the navigation recognition component may recognize any second position B, and move to the first position A along the preset direction D after recognizing the second position B. Specifically, a recognition of the plurality of second positions B by the navigation recognition component is random, which further enables a position where the robotic mower 1 turns to be random. And then it avoids the robotic mower 1 turning at same position multiple times, which causes wear or loss of surfaces of lawn or the working area. And a practicability of the robotic tool system 100 is further improved.

Further, the auxiliary positioning device 4 is further provided with a built-in correction module (not shown). The correction module is configured to set a third position C that is different from the first position A and the second position B and a correction parameter n, and the auxiliary positioning device 4 may correct the second position B according to the third position C and the correction parameter n.

Figure 17:
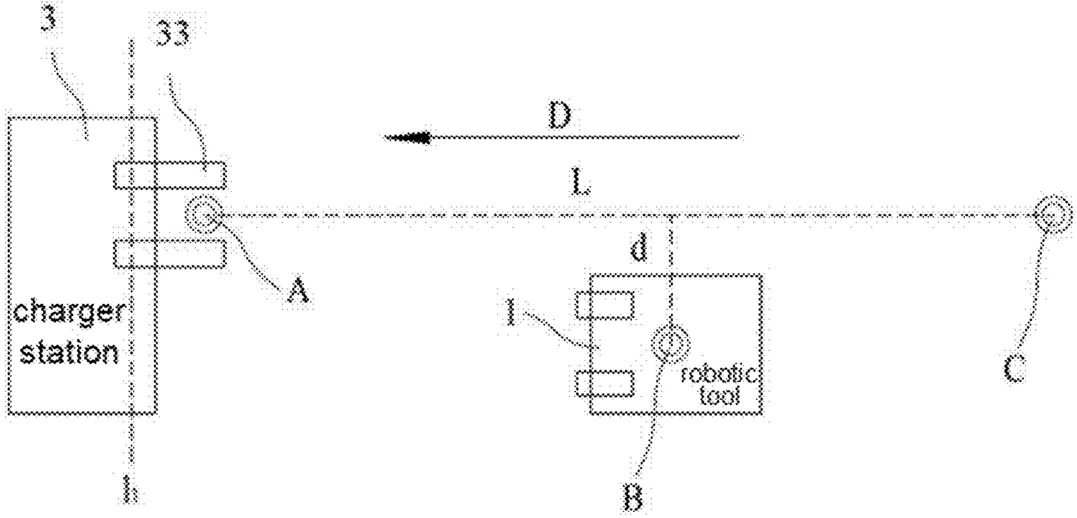
FIG. 17 is a schematic view of the working method of the robotic tool.

Please refer to FIG. 17, the third position C is set along an extension direction of the charging electrode plate 33. This may ensure that the robotic mower 1 realizes a best position for charging and plugging with the power supply device 3 along a connection line L between the third position C and the charging electrode plate 33. And a distance between the third position C and the first position A is greater than a distance between the second position B and the first position A.

Further, the correction parameter n is defined as a maximum deviation distance that may still realize the charging connection between the robotic mower 1 and the power supply device 3 when the second position B deviates from the connection line L. When a vertical distance d between the second position B and the connection line L between the first position A and the third position C is less than the correction parameter n, the robotic mower 1 may turn at the second position B and move to the first position A for charging along the preset direction D.

When the vertical distance d between the second position B and the connection line L between the first position A and the third position C is greater than the correction parameter n, the robotic mower 1 may not turn at the second position B and move to the first position A along the preset direction D for charging. At this time, the correction module controls the auxiliary positioning device 4 to select the second position B again.

It should be noted that in the embodiment mentioned above, it is only taken as an example that the auxiliary positioning device 4 is always matched with the power supply device 3, the navigation recognition component recognizes the preset position and the preset direction D preset on the auxiliary positioning device 4 and controls the robotic mower 1 to run. In other embodiments of the disclosure, the auxiliary positioning device 4 may further be removed after the preset position and the preset direction D are defined, and the robotic mower 1 directly realizes the charging connection with the power supply device 3 through a recording of the navigation recognition component.

Specifically, the navigation recognition component in this embodiment has functions of recognition, fitting and memory at the same time, which means that the navigation recognition component may record specific positions of the first position A, a plurality of second positions B, and the preset direction D set on the auxiliary positioning device 4, and fit to obtain the path map of the robotic mower 1 moving to the power supply device 3 for charging. When the auxiliary positioning device 4 is removed, the robotic mower 1 may still recognize the second position B along the path map and return to the first position A along the preset direction D to realize the charging connection with the power supply device 3.

Further, the auxiliary positioning device 4 in the disclosure may also be configured as a separate component for operation. Specifically, when the auxiliary positioning device 4 is used alone, the auxiliary positioning device 4 may match any power supply device 3 to assist the connection and charging of the robotic mower 1 with the power supply device 3. And in this embodiment, the robotic mower 1 may be any kind of automatic outdoor device for performing outdoor tasks, and the charging port 113 of the robotic mower 1 is matched with the power supply port 22 of the power supply device 3, so that the power supply device 3 may be configured to supply power to the robotic mower 1.

The separate auxiliary positioning device 4 is also configured to calibrate the preset positions and the preset direction D, and the preset positions include a first position A that the robotic mower 1 connects with the power supply device 3 for charging, and a second position B set apart from the first position A. The second position B defines a preset direction D toward the first position A. The robotic mower 1 may recognize the second position B and move from the second position B to the preset first position A along the preset direction D to realize the charging connection with power supply device 3. Similarly, the auxiliary positioning device 4 may also correct a position of the second position B through setting the third position C, the correction parameter n, etc., so as to further improve accuracy of the charging connection between the robotic mower 1 and the power supply device 3. That is, when the auxiliary positioning device 4 is used alone, the automatic charging connection between two robotic mowers 1 and the power supply device 3 that are matched with each other may also be realized, and the working method of the robotic tool system mentioned above may be performed. Since a method and operation of the auxiliary positioning device 4 used alone is consistent with the one combined with robotic tool system, a structure and method of the auxiliary positioning device 4 will not be repeated in the following description.

It should be noted that when the auxiliary positioning device 4 is used alone, a shape of the matching part 41 in the auxiliary positioning device 4 matched with the power supply device 3 may be changed according to a shape of the power supply device 3. Further, a length and shape of the extension part 42 connected with the matching part 41 may also be changed according to a type and shape of the robotic mower 1 matched with the power supply device 3, which means that a description of the structure of the auxiliary positioning device 4 in this specification is only exemplary, and should not be limited to this.

The robotic tool system of the disclosure enables the robotic mower 1 to recognize the preset first position A, the plurality of the second positions B, and the preset direction D through the auxiliary positioning system 4 and the navigation recognition component which is arranged in the robotic mower 1 and may apply real-time kinematic technology. Further, the robotic tool system searches and moves to the second position B through the navigation recognition component, and moves from the second position B to the first position A along the preset direction D to realize the charging connection between the robotic mower 1 and the power supply device 3, which effectively improves a convenience of the robotic tool system of the disclosure. At the same time, operations of the working method of the robotic tool system for controlling the robotic tool system provided by the disclosure are simple and suitable for popularization.

Figure 13:
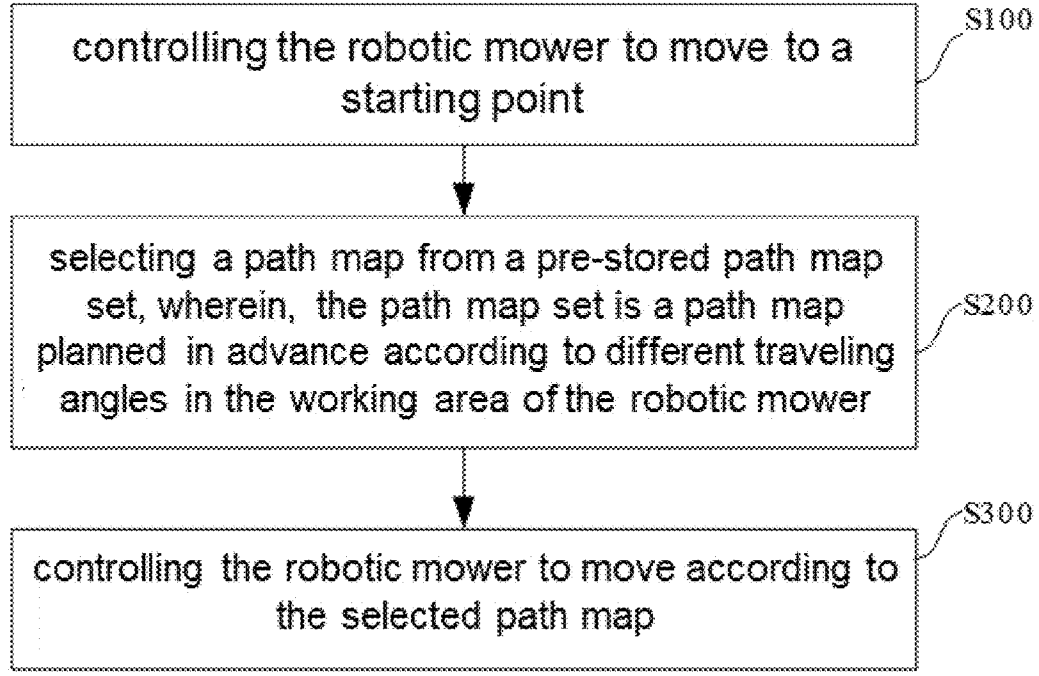
FIG. 13 shows a schematic flowchart of a control method of the robotic mower of the disclosure.

Please refer to FIG. 13, the disclosure further provides a control method of the robotic mower. After a boundary of the area to be mowed is determined to define a map of the working area of the mower, the mower may perform a mowing. The specific operations are as follows:

S100, controlling the robotic mower to move to a starting point,

S200, selecting a path map from a pre-stored path map set, wherein, the path map set is a path map planned in advance according to different traveling angles in the working area of the robotic mower, S300, controlling the robotic mower to move and work according to the selected path map.

Figure 14:
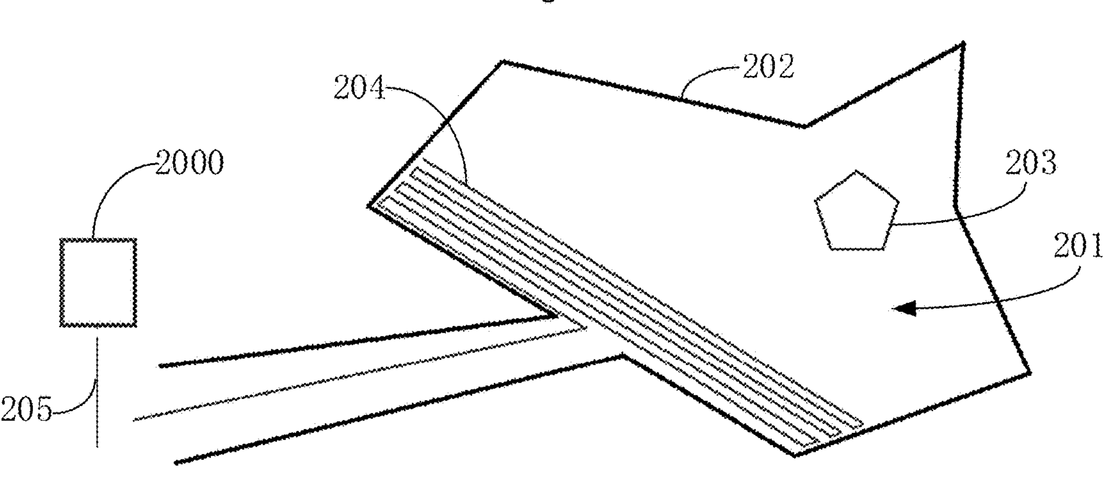
FIG. 14 is a schematic view of path planning of the robotic mower of the disclosure.
Figure 15A:
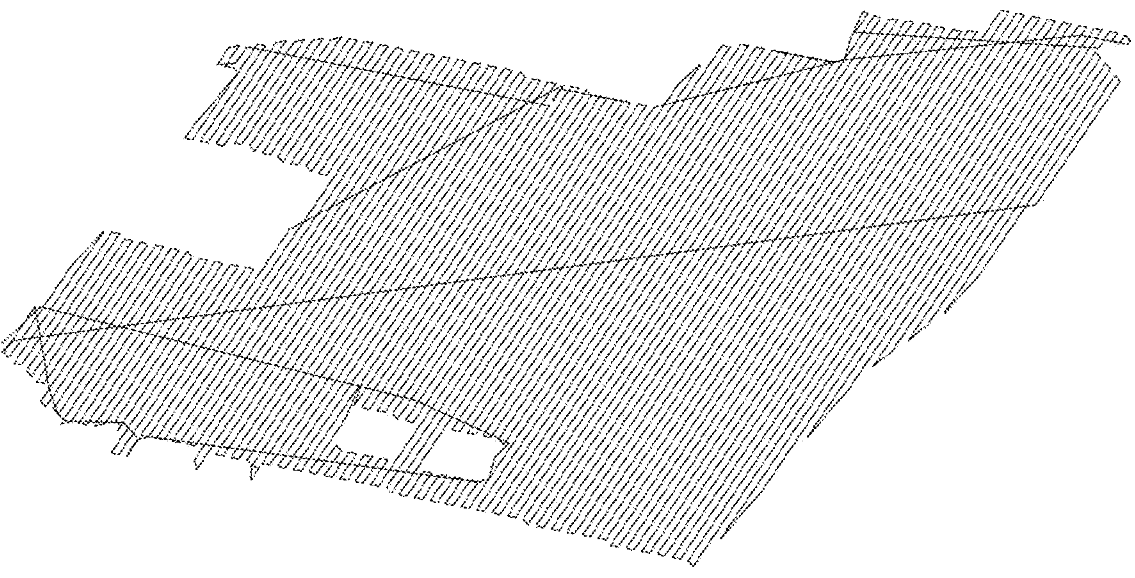
FIG. 15*a* through FIG. 15*d* show a use of the control method of the robotic mower of the disclosure for obtaining path maps of different traveling angles and operating widths.
Figure 15B:
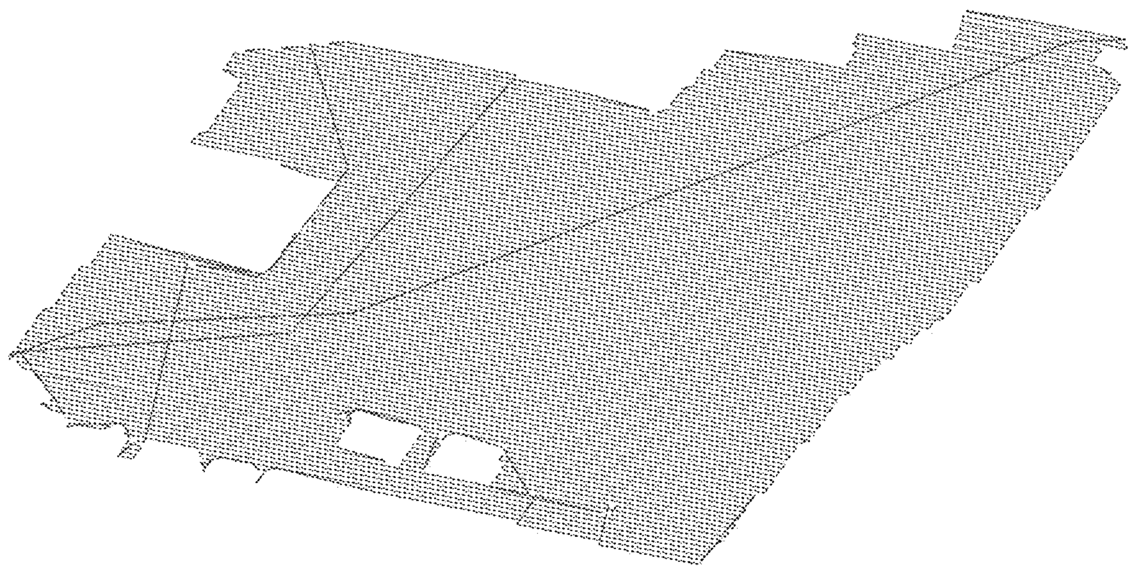
Figure 15C:
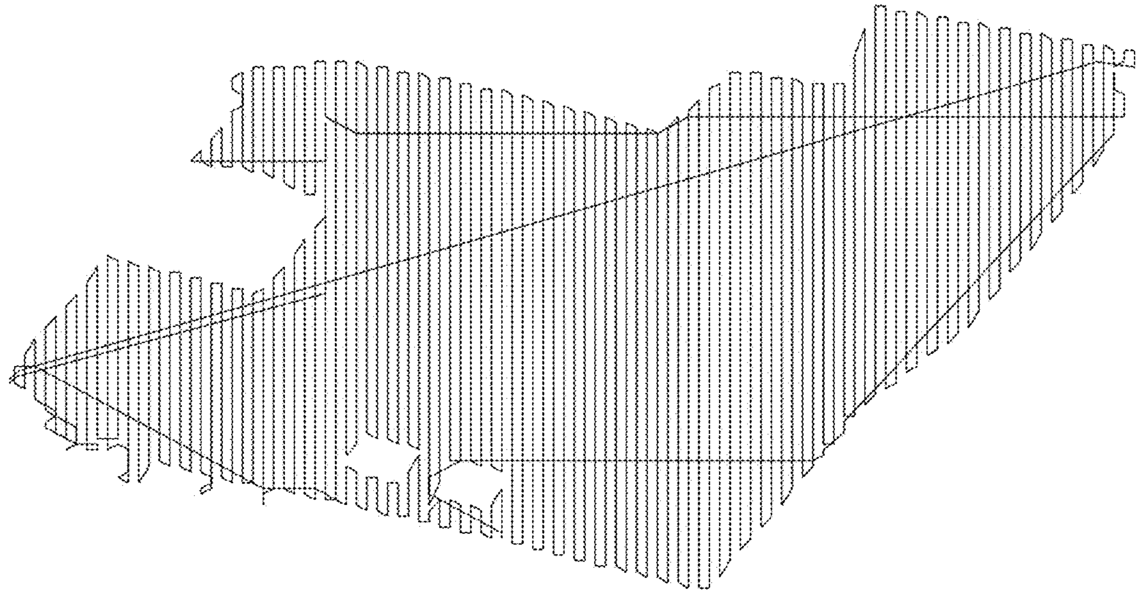
Figure 15D:
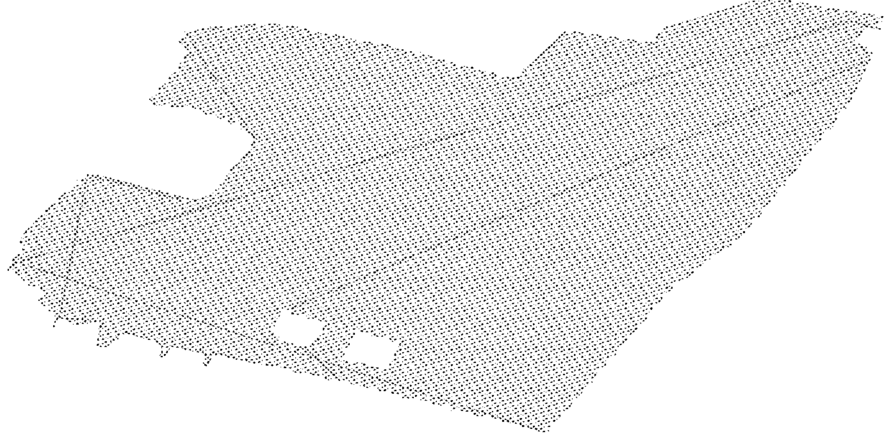

Please refer to FIG. 13 and FIG. 14, when the S100 is executed, and each time the mowing operation is performed, the robotic mower needs to be controlled to move to the starting point. The starting point may be, for example, a selected point located in the working area 201 of the robotic mower, or a position of a charger station 2000, or a certain point in a path connecting the charger station 2000 and the working area 201.

Please refer to FIG. 13, when performing the S100, it is necessary to store, download or import a path map set containing different paths in the control module of the robotic mower in advance, so as to facilitate the mower to call the path map set when moving. FIG. 14 shows a schematic view of obtaining a path map set.

Please refer to FIG. 14. Before the mower starts to work, it is necessary to define a working area map of the robotic mower: the robotic mower may be controlled to move along a boundary 202 of the working area 201. Then, during moving, a position sensor is configured to collect real-time position coordinates (as a position of the working area) of the robotic mower and store the coordinates in a storage device as map data of the working area. The position sensor may be a satellite-based navigation device, such as a global positioning module, which is called GPS module for short. A signal of the GPS module may be corrected to improve positioning accuracy (real-time kinematic differential GPS, real-time kinematic carrier phase differential GPS and the like). It can be understood that, in some embodiments, the position sensor may also use a laser and an optical device as a positioning technology sensor, for example. Usually, there will be some obstacles 203 (such as trees, bushes, pools, some raised structures exposed on the ground, etc.) in the working area 201. During an operation, it is necessary to avoid such obstacles, so it should be recognized on the working area map through related technologies. Specifically, for example, the robotic mower may be controlled to move along an edge of the obstacle 203 in the working area 201. A position of the obstacle is collected and saved by the position sensor mentioned above, and is marked as an exclusion area on the working area map, so as to automatically bypass the exclusion area in subsequent path planning. Then, after a definition of the working area map of the robotic mower is completed, it is necessary to separately plan the path map 204 when the robotic mower moves along different traveling angles in the working area according to the working area map of the robotic mower to form the path map set. Wherein, the traveling angle may be defined as an angle between a traveling direction of the robotic mower and a certain reference line (for example, a straight line segment of the boundary line of the working area). The traveling angle of the robotic mower is any value between 0° and 180°. As an example, the path map when the traveling angle is 0° (180°), 5°, 10°, 15°, . . . , 170°, and 175° may be obtained with an angle variable of 5°, so that a path map set may be formed. The angle variable may be set according to needs. The smaller the angle variable is, the more path maps are generated, and vice versa. It should be noted that in a process of path planning, it is also possible to minimize a number of turns of the robotic mower or shorten a total path to be a shortest one to optimize each path map. It is understandable that the path map set may be, for example, a path map planned in advance according to different traveling angles and working widths of the robotic mower in the working area. This may generate different path maps through adjusting the traveling angle and working width. The working width is defined as a distance between two parallel internal passages of the robotic mower, or a distance between partial parallel passages in a case of a curved passage. Wherein, FIG. 15*a* through FIG. 15*d* respectively correspond to the planned path maps with different traveling angles and different working widths.

Please refer to FIG. 13, the S200 and S300 are performed. Each time when mowing, a path map needs to be selected from the pre-stored path map set, and then the robotic mower is controlled to move and work according to the selected path map.

In the S200, a path map is selected from the stored path map set according to a specified map selection method. For example, a path map may be randomly selected from the pre-stored path map set in a random manner, or a path map may be selected from the pre-stored path map set each time in an incremental or decremental way of the traveling angle. Or a path map may be selected from the pre-stored path map set according to a received external instruction, so that it may be basically ensured that a moving path for each mowing in multiple mowing operations is different (there may be two repetitions when randomly selected), which avoids a problem of repeated rolling and rutting when moving along a fixed path. Wherein, each time when a path map is selected from the pre-stored path map set in an incremental or decremental way of the traveling angle, a path map may be selected according to an increment of the traveling angle of 5°, 10°, 15°, 30° (or other suitable values) from the pre-stored path map set, until all traveling angles are traversed, and then a path map will be selected from the pre-stored path map set in an incremental or decremental manner again.

In the S300, during mowing, due to a large area of the working area or a limited battery capacity of the robotic mower, a mowing operation of the entire working area cannot be completed at one time. When power of the robotic mower is insufficient, the robotic mower may be controlled to return to the charger station and record a current position (which means a return point) of the robotic mower. After charging, the robotic mower returns to the return point and continues to move and work along an original path.

In the S300, during mowing, when weather are not suitable for the robotic mower to work, such as rain, snow, hail, strong wind and other bad weathers, the robotic mower is controlled to return to the charger station and record the return point of the robotic mower. After a charging is completed or when the weather are suitable for mowing of the robotic mower, the robotic mower returns to the return point and continues to move and work along the original path. The robotic mower may determine whether current weather are suitable for the robotic mower to work by receiving local weather forecasts, for example. It is also possible to monitor external weather information through a rain and snow sensor, a wind speed sensor and other sensors that can monitor the weather arranged on the robotic mower. The control module of the robotic mower determines whether the robotic mower suspends or stops mowing according to the monitored weather.

It should be noted that the control method of the robotic mower of the disclosure further includes operations of presetting mowing time. The user may set mowing time of the robotic mower according to actual needs. The robotic mower executes mowing operation within the presetting mowing time, and suspends or stops mowing in other periods outside the presetting mowing time. For example, the mowing time may be preset between 10:00 and 20:00, so as to avoid mowing outside the presetting mowing time which affects rest of the user or neighbors.

As shown in FIG. 14, positions of the charger station 2000 and a guide line 205 are also defined on the working area map, so that the robotic mower may be conveniently controlled to enter the charger station for charging and move out from the charger station for working. The charger station may be arranged on a path edge 202 of the working area, or may be arranged far away from the working area. When the robotic mower 1 returns to the charger station 2000 for charging, the charging port of the robotic mower 1 needs to be accurately connected with a charging terminal of the charger station 2000 (power supply device 3). The disclosure provides an auxiliary positioning device 4, in order to assist the charging port of the robotic mower 1 to accurately connect with the charging terminal of the charger station 2000 when the robotic mower 1 returns to the charger station 2000 for charging.

Figure 16:
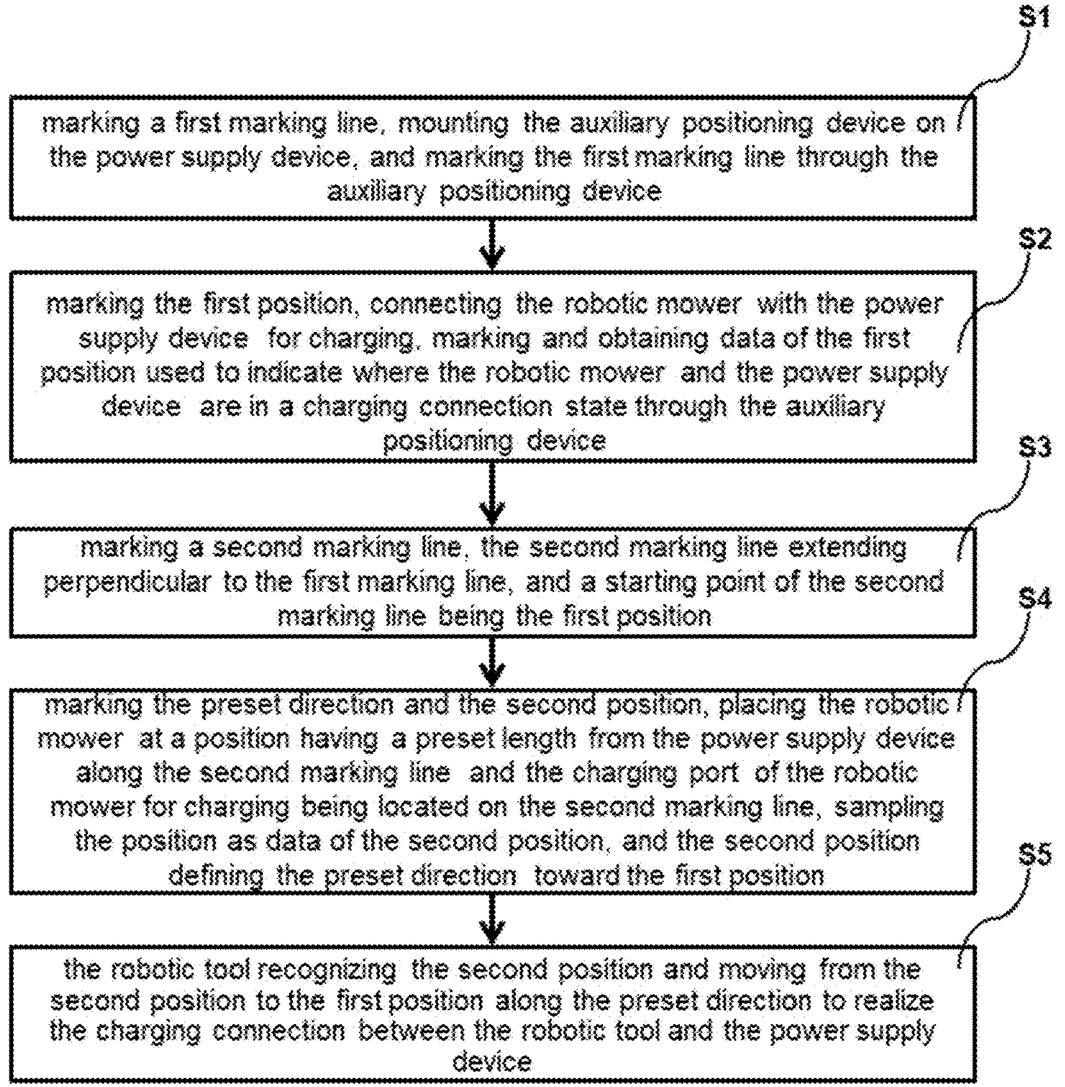
FIG. 16 is a schematic flowchart of a working method of the robotic tool.

Please refer to FIG. 16, FIG. 17 and FIG. 9, in this embodiment, the disclosure further provides a working method of the robotic tool system for controlling the robotic tool for charging. The working method of the robotic tool system includes following operations:

S1, marking a first marking line 11, mounting the auxiliary positioning device 4 on the power supply device 3, and marking the first marking line 11 through the auxiliary positioning device 4, S2, marking the first position A, connecting the robotic mower 1 with the power supply device 3 for charging, marking and obtaining data of the first position A configured to indicate where the robotic mower 1 and the power supply device 3 are in a charging connection state through the auxiliary positioning device 4, S3, marking a second marking line 12, the second marking line 12 extending perpendicular to the first marking line 11, and a starting point of the second marking line 12 being the first position A, S4, marking the preset direction D and the second position B, placing the robotic mower 1 at a position having a preset length from the power supply device 3 along the second marking line 12 and the charging port 113 of the robotic mower 1 for charging being located on the second marking line 12, sampling the position as data of the second position B, and the second position B defining the preset direction D toward the first position A, S5, the robotic mower 1 recognizing the second position B and moving from the second position B to the first position A along the preset direction D to realize the charging connection between the robotic mower 1 and the power supply device 3.

Following part of the specification will describe the S1 through S5 in detail.

Specifically, in the S1, the first marking line 11 is arranged perpendicular to the extension direction of the charging electrode plate 33 of the power supply device 3. In the S2, the data of the first position A may be position coordinates of the first position A that can be recognized and recorded by the navigation recognition component. Of course, in other embodiments of the disclosure, the data of the first position A may also be other data used to calibrate the first position A, as long as it may be recognized and recorded by the navigation recognition component.

Further, the working method of the robotic tool system further includes a correction of the second position B, and correction operations of the second position B includes:

setting the third position C that is different from the first position A and the second position B, and the second position B being located between the first position A and the third position C, setting the correction parameter n, and the robotic mower 1 turning at the second position B and moving to the first position A along the preset direction D for charging when a vertical distance d between the second position B and the connecting line L between the first position A and the third position C is less than the correction parameter n, correcting the second position B when the vertical distanced between the second position B and the connecting line L between the first position A and the third position C is greater than the correction parameter n.

There are a plurality of the second positions B set in the S4 at the same time, and a plurality of the vertical distances d between the second position B and the connecting line L between the first position A and the third position C are less than the correction parameter n. With this arrangement, it may effectively prevent the robotic mower 1 from turning at the same position for multiple times and causing damage to the working area of the robotic mower 1 or lawn surface.

Further, the working method of the robotic tool system includes: the robotic mower 1 establishes a path map for the robotic mower 1 to move to the power supply device 3 for charging according to the first position A, the plurality of the second positions B, and the preset direction D. Specifically, an establishment of the path map is mainly realized by the navigation recognition component in the robotic mower 1, and the navigation recognition component may be configured for an application of real-time kinematic technology to further improve accuracy of charging connection between the robotic mower 1 and the power supply device 3.

It should be noted that, in order to facilitate a description of the working method of the robotic tool system in this specification, an operation sequence is marked. However, in actual application process, a sequence between the operations may be adjusted according to actual needs, and different two or more operations may also be carried out at the same time, which means that marking of the operation sequence of the working method of the robotic tool system in this specification is only exemplary and should not be limited here.

Figure 18:
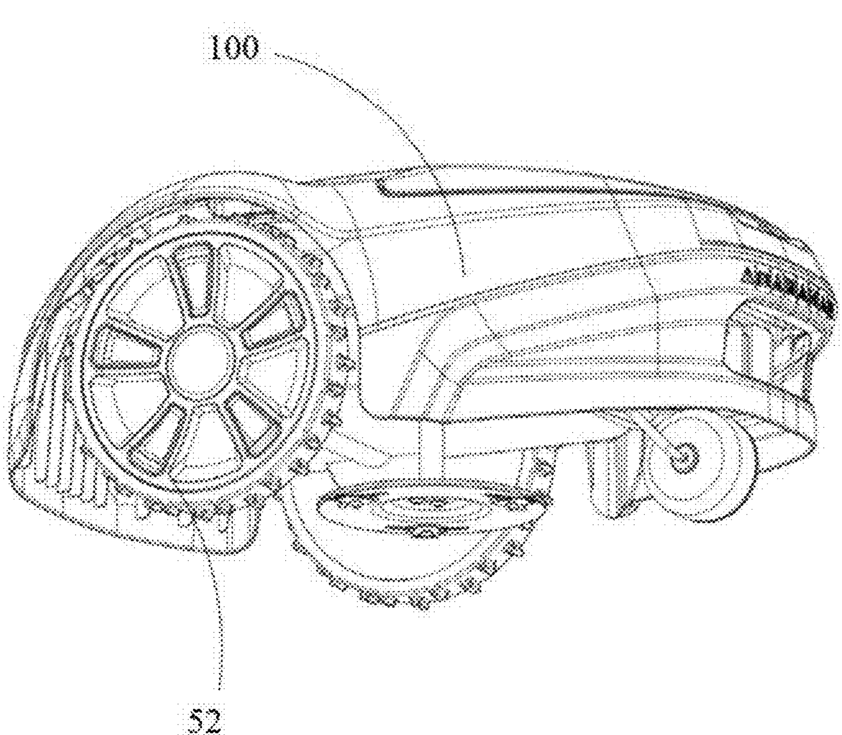
FIG. 18 is a structural schematic view of the mower.

Please refer to FIG. 18, in this embodiment, the robotic mower is disclosed as a mower 100. The mower 100 includes a position collection device 5. At this time, the mower 100 and the position collection device 5 share the traveling module 52.

Figure 19:
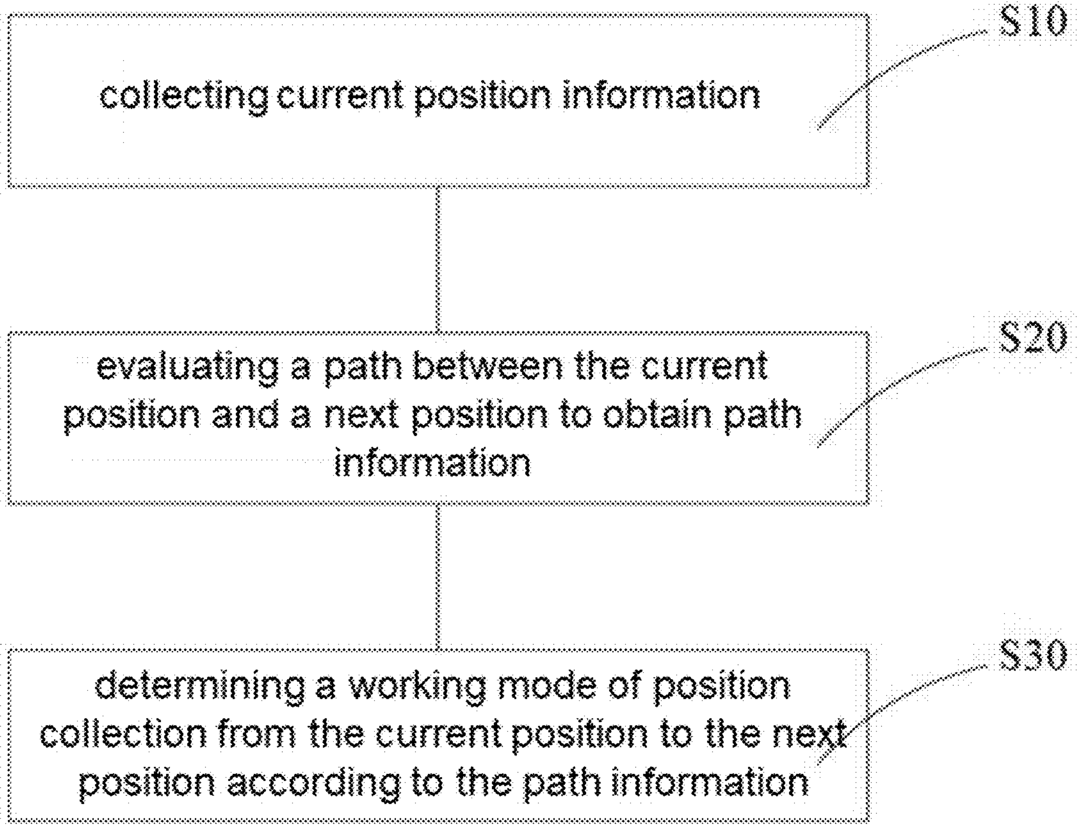
FIG. 19 is a schematic flowchart of a method for collecting position information of the disclosure.

Please refer to FIG. 19, the disclosure further discloses a method for collecting position information, which is applied in the position collection device 5. The position collection device 5 is configured to collect current position information in real time, and has at least two position collection working modes. The method for collecting position information includes the following operations:

S10: collecting the current position information,

S20: evaluating a path between the current position and a next position to obtain path information, S30: determining a working mode of position collection from the current position to the next position according to the path information.

Figure 20:
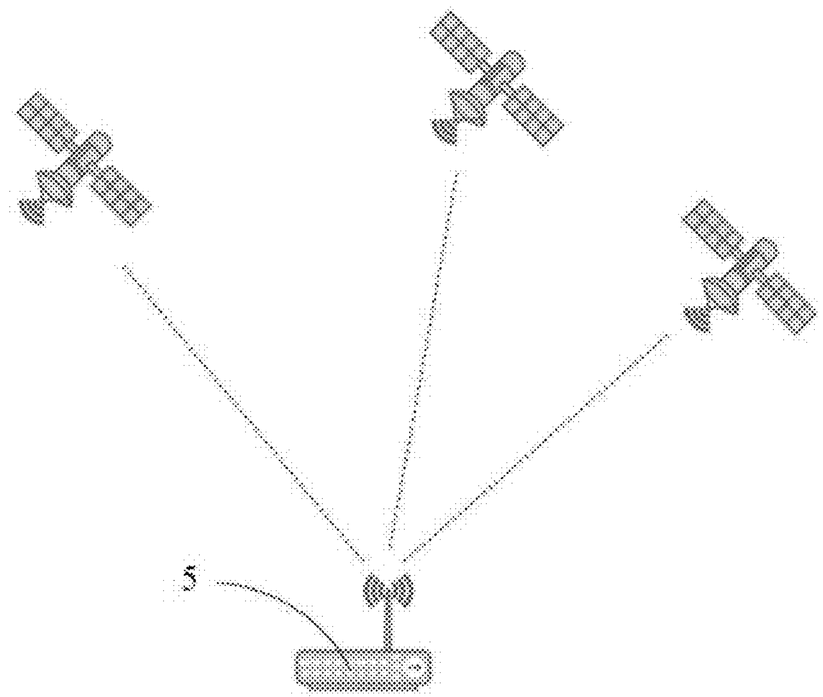
FIG. 20 is a principle schematic view of the method for collecting position information of the disclosure.
Figure 21:
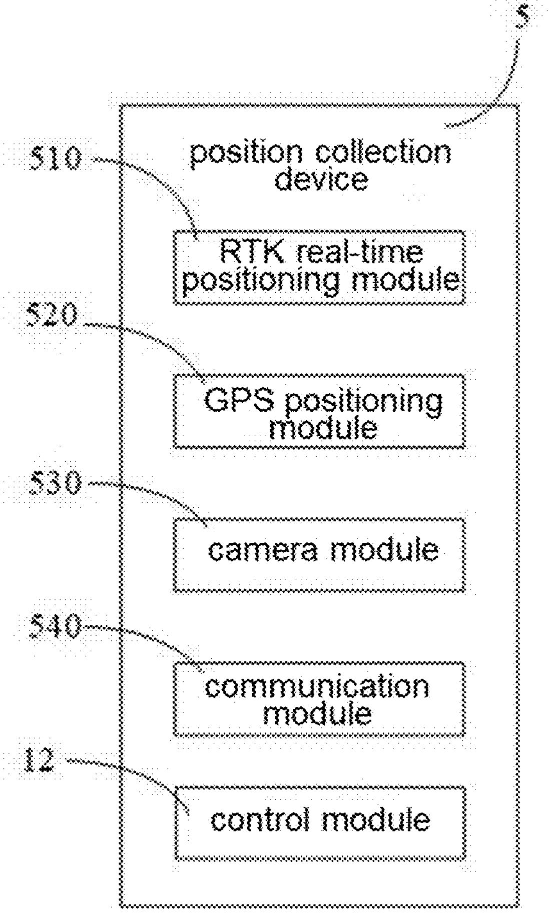
FIG. 21 is a block schematic view of another position collection device according to an embodiment of the disclosure.

Please refer to FIG. 20 and FIG. 21, in this embodiment, the position collection device 5 obtains the position information through a principle of satellite positioning. In a specific embodiment, the position collection device 5 includes a positioning module 510, a GPS positioning module 520, a camera module 530, a communication module 540, and a control module 550. The positioning module 510 is a RTK real-time positioning module for obtaining the current position information in real time. The GPS positioning module is configured to position the position collection device 5 and obtain GPS positioning information thereof. The camera module 530 is configured to photograph and obtain the path between the current position and the next position. The control module 550 generates a navigation path according to the positioning information and the path information of the GPS positioning module, and guides the position collection device 5 to move along the navigation path. The communication module 540 transmits data collected by the positioning module 510 to another device, such as the mower, so that the device may process the data to generate an accurate boundary curve. Preferably, the communication module 540 is a wireless communication module. The position collection working mode includes at least one of a fixed period collection mode (the timing mode), a fixed distance collection mode (the interval mode), or the manual mode. The path information includes a straight line path, a curved path, a polyline path, and so on. Wherein, the straight line path includes a straight line in a strict sense and an approximate straight line.

Figure 22:
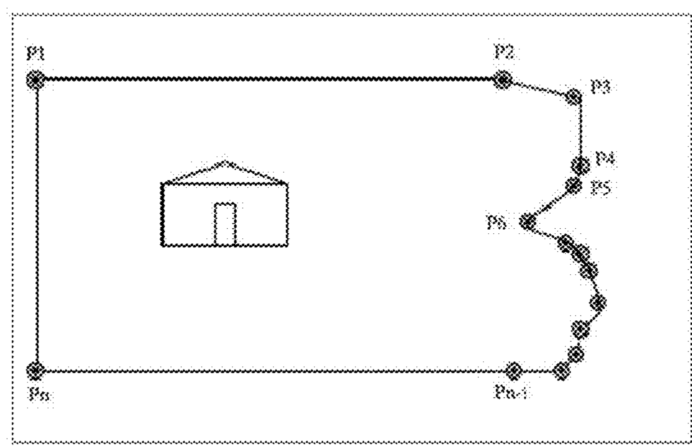
FIG. 22 is a view of a simulation scenario.
Figure 23:
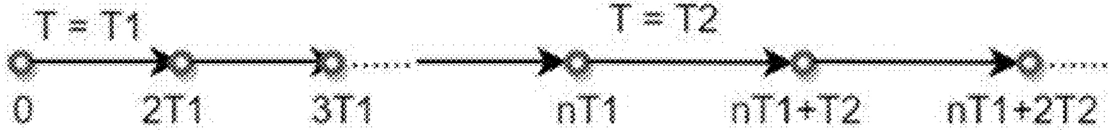
FIG. 23 is a working schematic view of a fixed period collection mode.
Figure 24:
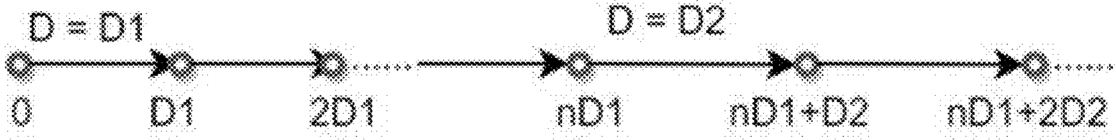
FIG. 24 is a working schematic view of a fixed distance collection mode.

When the path information is a straight line path, it is determined that the position collection working mode is the manual mode. FIG. 22 shows a simulated usage scenario, the user needs to collect position information around a house. Wherein, a path from the point P1 to the point P2 is a straight line path, at this time only the manual mode is needed, so as to reduce an amount of data while meeting demands. As shown in FIG. 23, when the path information is a curved path, it is determined that the position collection working mode is the fixed period collection mode. For example, the curved path from a point P6 to a point Pn−1 in FIG. 22 is a curved path. In this case, the fixed period collection mode may be configured to increase an amount of data collection. As shown in FIG. 24, when the path information is a polyline path, it is determined that the position collection working mode is the fixed distance collection mode. For example, a point P2 to the point P6 in FIG. 22 is a polyline path, at this time the fixed distance collection mode may be used.

Figure 25:
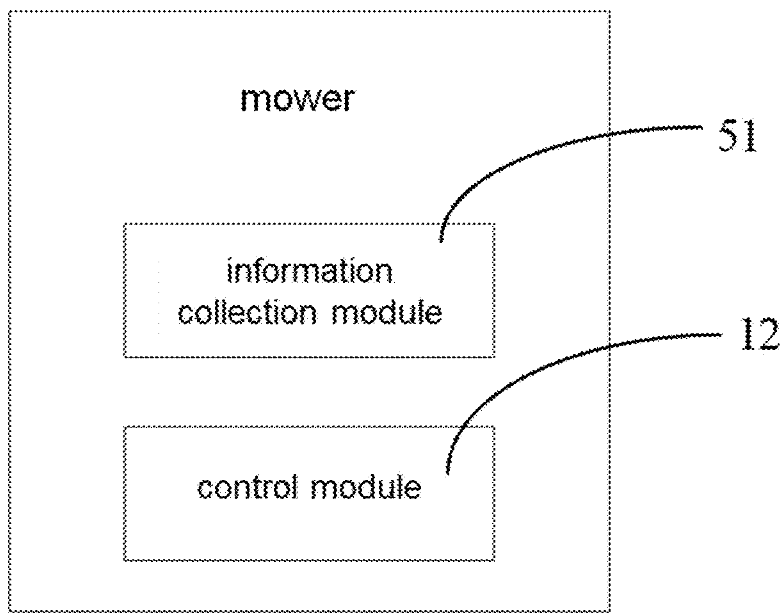
FIG. 25 is a block schematic view of a mower according to an embodiment of the disclosure.
Figure 27:
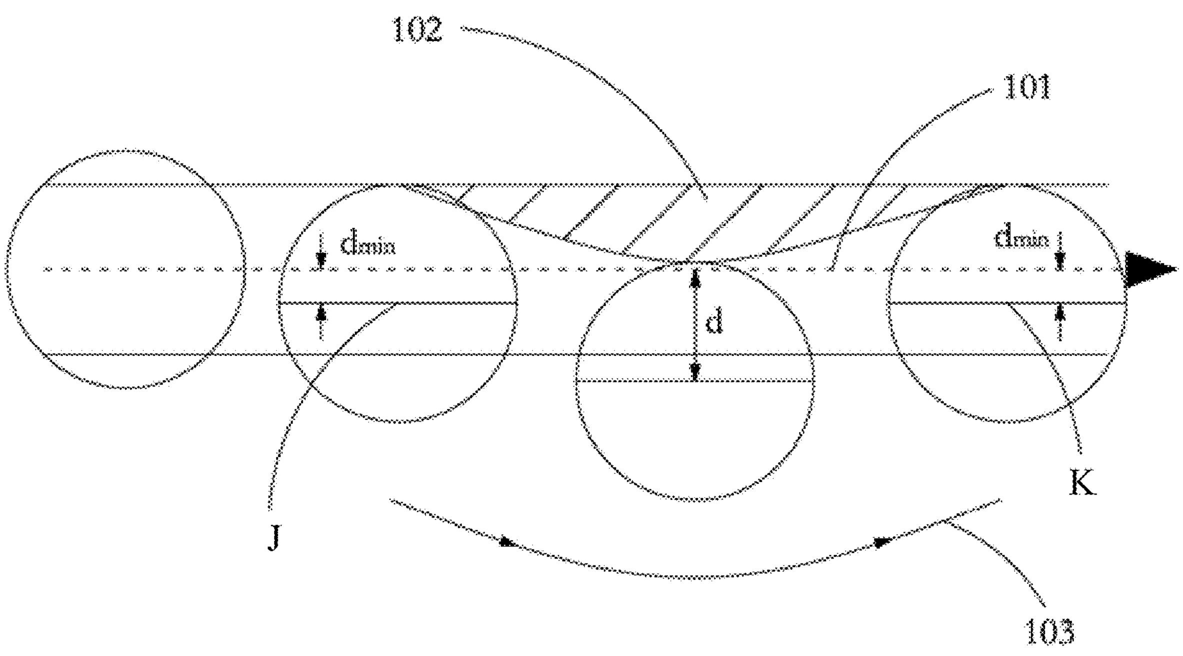
FIG. 27 is a schematic view of supplementary mowing when there is a missing mowing area of the mower of the disclosure.

Please refer to FIG. 25, in another embodiment, the robotic mower 1 further includes the information collection module 51 and control module 12 mentioned above. The robotic mower 1 is described by taking a mower 200 as an example. Specifically, the information collection module 51 is also configured to collect current coordinate information of the mower 200, and judges whether the mower 200 deviates from a planned path 101 (a path map selected from the path map set) according to the coordinate information, which defines a missing mowing area 102 (as shown in FIG. 27). The planned path 101 may be a navigation path arranged manually, or a navigation path planned by a computer system, or a navigation path pre-stored in the mower 200. The control module 12 controls a working state of the mower 200 according to whether the mower 200 deviates from the planned path 101. When the mower deviates from the planned path 101, the control module 12 controls the mower 200 to return to the planned path 101 to perform a supplementary mowing in the missing mowing area 102.

Figure 26:
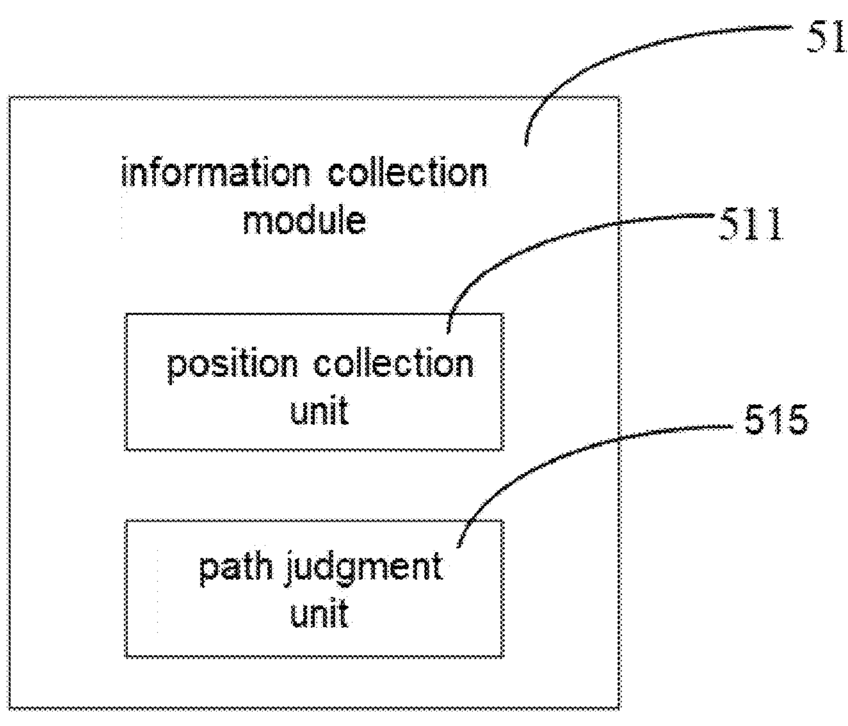
FIG. 26 is a block schematic view of an information collection module of the mower.

Please refer to FIG. 26. In this embodiment, the information collection module 51 includes a position collection unit 511 and a path judgment unit 515. The path judgment unit 515 judges whether the mower 200 deviates from the planned path 101 according to the coordinate information, and defines a missing mowing area 102. When a minimum distance d between the coordinate information and the planned path 101 is greater than a distance threshold $d_{min}$, it is determined that the mower 200 deviates from the planned path 101. The distance threshold $d_{min}$ may be set by the user as required.

Please refer to FIG. 27. Although the RTK navigation has a high accuracy, a movement trajectory of the robotic mower 200 is prone to deviation when it is affected by uneven ground, wheel slippage, etc. This causes that there is a no mowing area where should be mowed, which defines a missing mowing area. When the mower 200 deviates from the planned path 101, the control module 12 controls the mower 200 to move forward along a direction 103 to return to the planned path 101. At this time, a position of the mower 200 on the planned path 101 is position K. Then, the control module 12 controls the mower 200 to return to a position J before a deviation occurs along the planned path 101 at a first speed, and then to move forward to the position K before returning at a second speed. When the mower 200 returns from the position K before returning to the position J before the deviation occurs along the planned path 101 at the first speed, a working unit of the robotic mower 1 works to carry out the supplementary mowing in the missing mowing area 102. When the mower 200 moves forward along the planned path 101 at the second speed from the position J before the deviation to the position K before returning, the working unit of the mower 200 stops working or works at a low speed. With this arrangement, it can effectively save power of the mower 200, thereby prolonging working time of the mower 200. Preferably, the first speed is less than the second speed, and the first speed is a speed of the mower 200 when running normally. With this arrangement, it can effectively shorten time for the mower 200 to perform the supplementary mowing, thereby improving an operation efficiency of the mower 200. Of course, it can be understood that in other embodiments, it can also be set as: when the mower 200 returns from the position K before returning to the position J before the deviation along the planned path 101 at the first speed, the working unit of the mower 200 stops working or works at a low speed. When the mower 200 moves forward along the planned path 101 from the position J before the deviation to the position K before returning at the second speed, the working unit of the mower 200 works. At this time, the first speed is greater than the second speed.

Figures 28, 29:
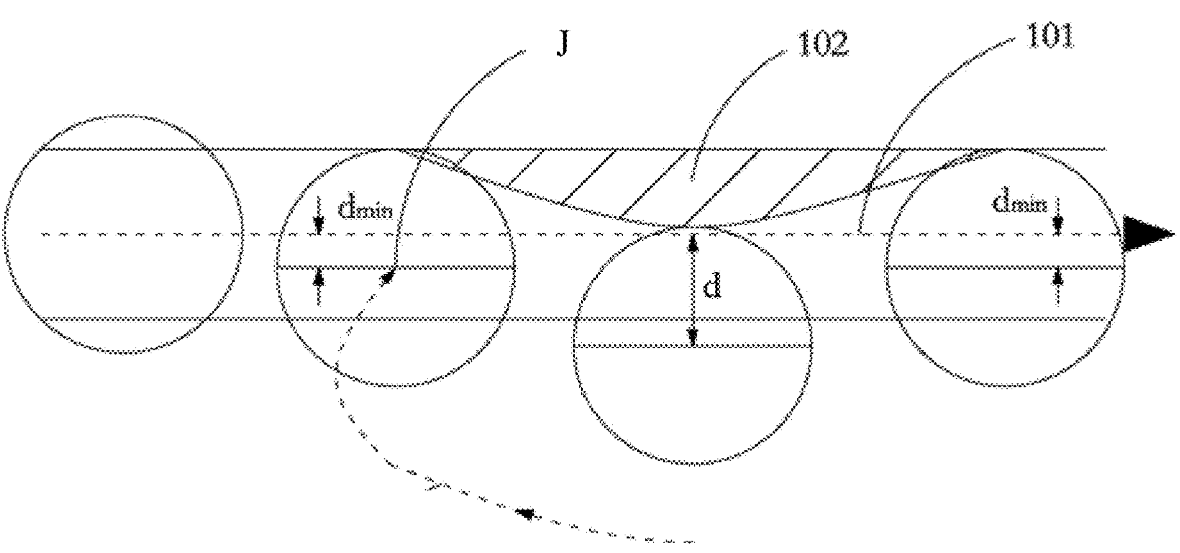
FIG. 28 is a schematic view of supplementary mowing in another embodiment when there is a missing mowing area of the mower of the disclosure.
FIG. 29 is a block schematic view of a mower according to an embodiment of the disclosure.
Figure 30:
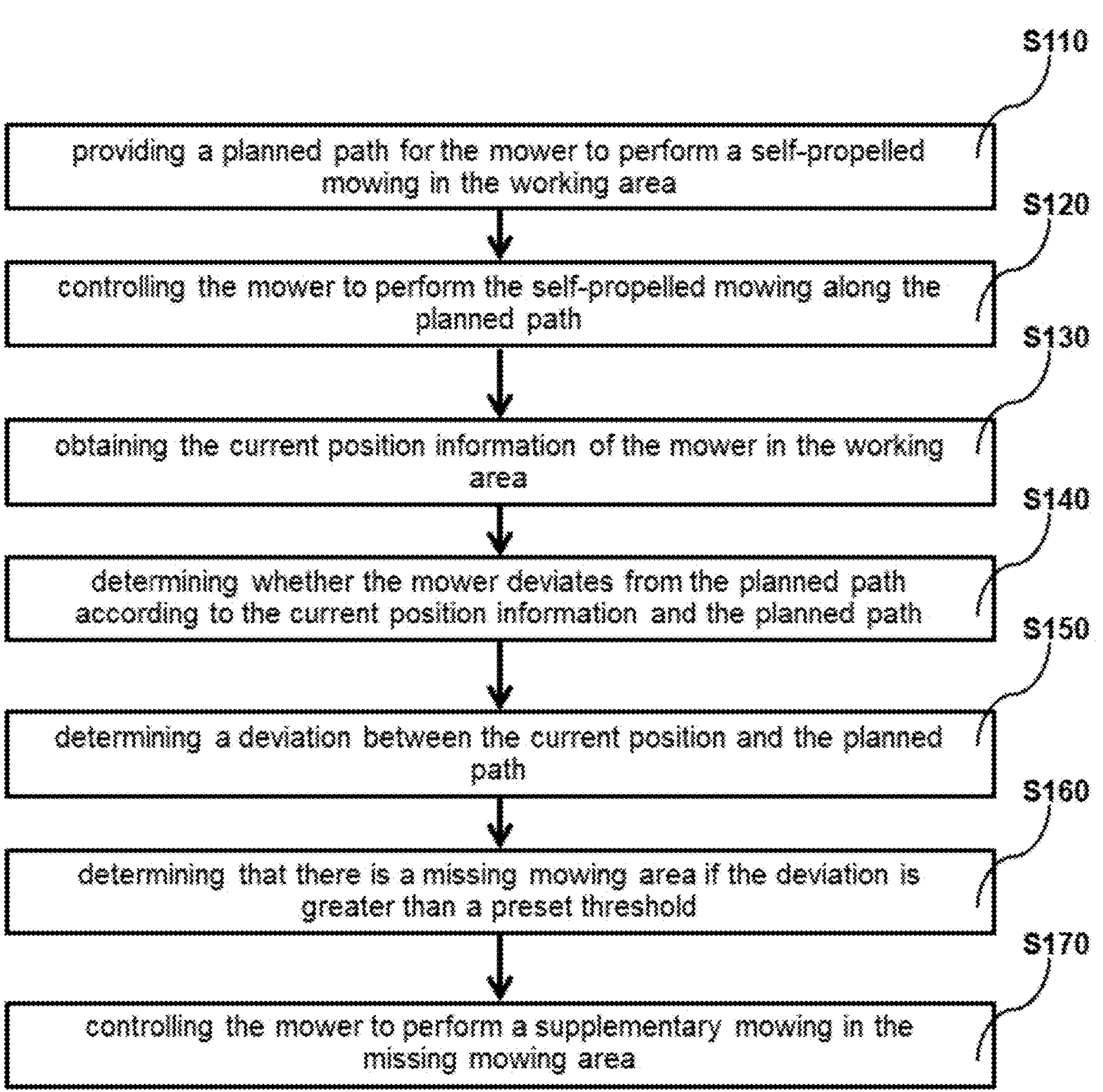
FIG. 30 is a schematic flowchart of a control method for the mower according to an embodiment of the disclosure.
Figure 31:
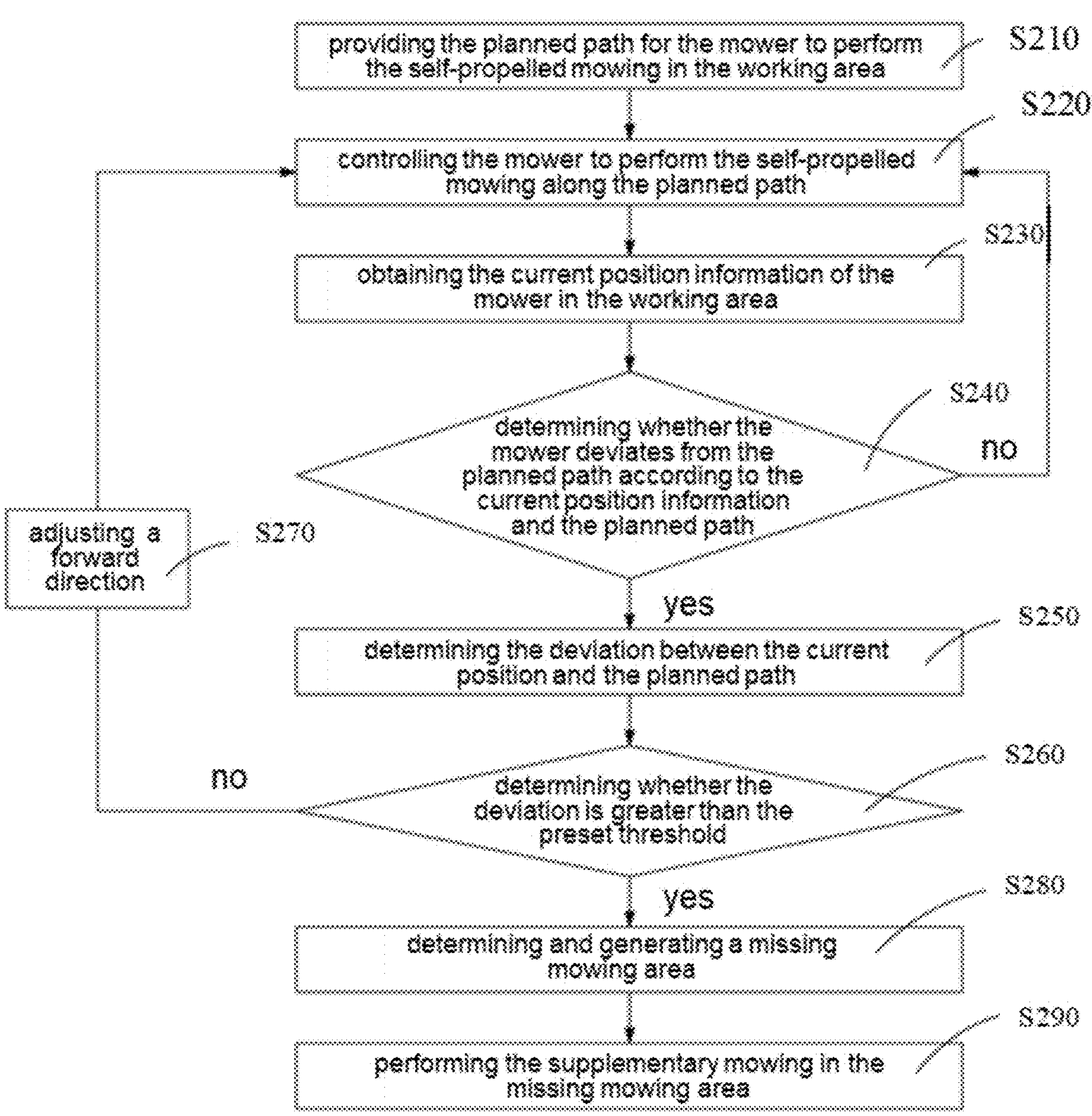
FIG. 31 is a schematic flowchart of a control method for a mower according to another embodiment of the disclosure.

Please refer to FIG. 28. In other embodiments, the mower 200 may also be configured as: when the mower 200 deviates from the planned path 101, the control module 12 controls the mower 200 to retreat at the second speed to gradually return to the position J before the deviation, and then the mower 200 is controlled to move forward along the planned path 101 at the first speed for mowing. At this time, the first speed is the speed of the mower 200 when running normally. In some embodiments, the second speed is greater than the first speed. In addition, when the mower retreats to the position J before the deviation, the working unit of the mower 200 stops working or works at a low speed, thereby saving power.

The mower 200 of the disclosure may automatically adjust a moving direction of the mower 200 when it deviates from the planned path 101 to perform the supplementary mowing in the missing mowing area 102, thereby reducing labor intensity of the user.

Please refer to FIG. 29. In a specific embodiment, the mower 200 is configured for self-propelled mowing in the working area. The mower includes a positioning module 210, a path planning unit 232 and a control module 12. The positioning module 210 is configured for real-time positioning of the mower, so as to obtain the current position information of the mower 200 in the working area. In this embodiment, the positioning module 210 is an RTK (real-time positioning) differential module. The path planning unit 232 is configured to provide the self-propelled mowing path of the mower 200 in the working area. The control module 12 is connected with the positioning module 210 and the path planning unit 232. The control module 12 determines whether the mower 200 deviates from the planned path according to the position information and the planned path. When there is an deviation between the position information and the planned path, it is determined that the mower 200 deviates from the planned path. When the deviation is greater than a preset threshold, it is determined that there is a missing mowing area. At this time, the control module 12 controls the mower 200 to perform the supplementary mowing in the missing mowing area.

Further, when it is determined that there is a missing mowing area, the control module 12 controls the mower 200 to retreat or turn to perform the supplementary mowing in the missing mowing area. Then, the control module 12 controls the mower 200 to adjust a forward direction, so that the mower returns to the planned path.

In this embodiment, the disclosure further provides a control method for controlling the mower 200 to perform the self-propelled mowing in the working area.

The control method includes following operations:

S110: providing a planned path for the mower to perform the self-propelled mowing in the working area.

S120: controlling the mower to perform the self-propelled mowing along the planned path.

At this time, the mower moves along the planned path under a guidance of the navigation module and mows lawn. The planned path may be a navigation path set manually, a navigation path planned by a computer system or a control system of the mower, or a navigation path pre-stored in the mower.

S130: obtaining the current position information of the mower in the working area.

At this time, the mower obtains the current position information of the mower through the positioning module. The positioning module is a RTK positioning module. The current position information of the mower refers to the coordinates of a center point of the work unit of the mower.

S140: determining whether the mower deviates from the planned path according to the current position information and the planned path.

S150: determining the deviation between the current position and the planned path.

S160: determining that there is a missing mowing area if the deviation is greater than the preset threshold.

S170: controlling the mower to perform the supplementary mowing in the missing mowing area.

Please refer to FIG. 27, the mower obtains a minimum distance d between the current position and the planned path through comparing the planned path with the position information obtained in real time by the positioning module, and judges whether the mower deviates from the planned path according to the distance d. When the distance d is greater than the distance threshold $d_{min}$, it is determined that the mower deviates from the planned path. Otherwise, it is determined that the mower does not deviated from the planned path. When it is determined that the mower deviates from the planned path, the mower generates a missing mowing area according to the current position information and the planned path. Then, under the guidance of the navigation module, the mower will perform the supplementary mowing in the missing mowing area.

Specifically, the control method includes:

S210: providing the planned path for the mower to perform the self-propelled mowing in the working area.

S220: controlling the mower to perform the self-propelled mowing along the planned path.

S230: obtaining the current position information of the mower in the working area.

At this time, the mower obtains the current position information of the mower through the positioning module. The positioning module is the RTK positioning module. The current position information of the mower refers to coordinates of a center point of a cutting assembly of the mower.

S240: determining whether the mower deviates from the planned path according to the current position information and the planned path, if yes, skipping to S250, if not, skipping to the S220.

S250: determining the deviation between the current position and the planned path.

S260: determining whether the deviation is greater than the preset threshold, if yes, skipping to S280, if not, skipping to the S270.

S270: controlling the mower to adjust the forward direction and skip to the S220.

S280: determining and generating the missing mowing area.

S290: controlling the mower to perform the supplementary mowing in the missing mowing area.

Figure 5:
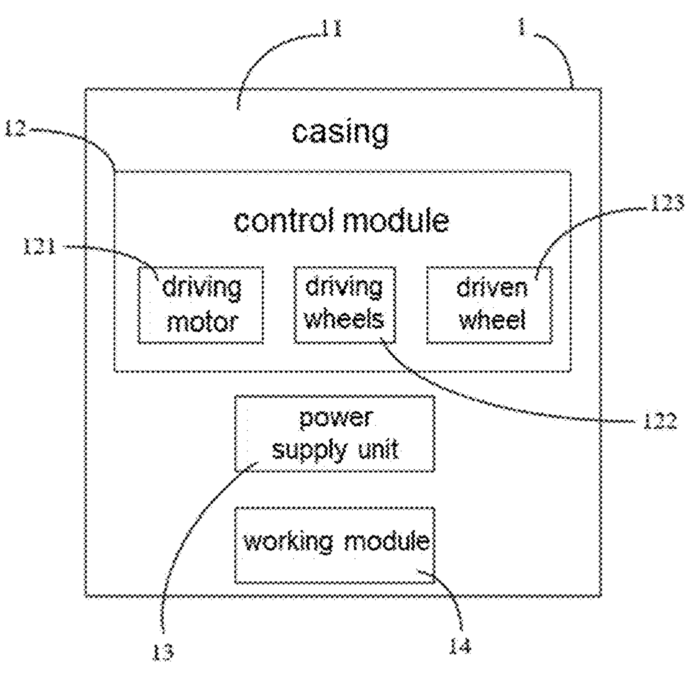
FIG. 5 is a block schematic view of the robotic tool.
Figure 6:
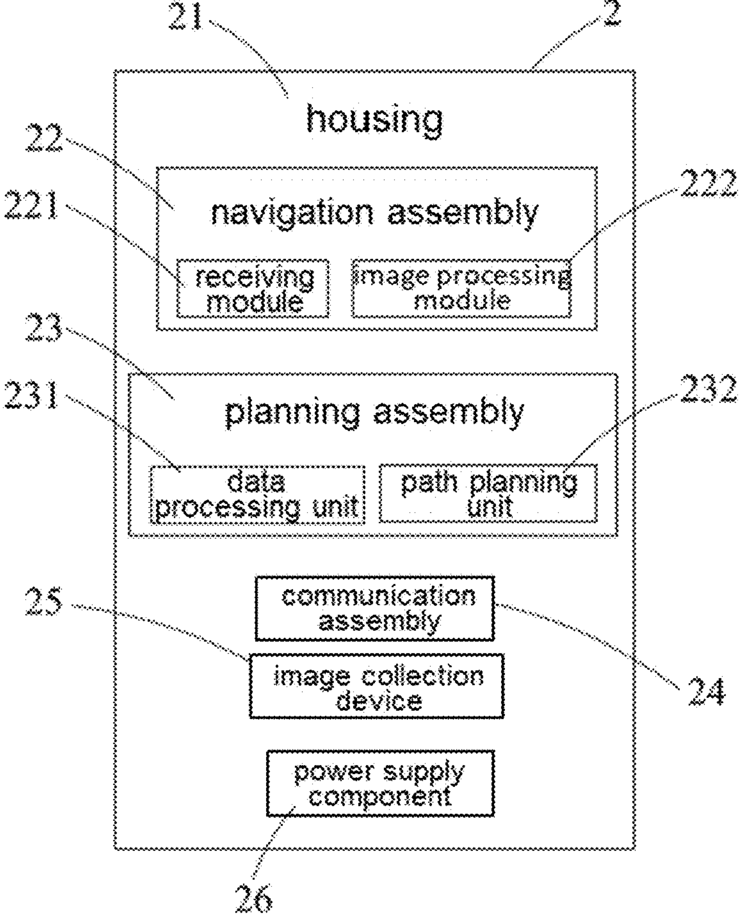
FIG. 6 is a block schematic view of the navigation control device in FIG. 2.

Please refer to FIG. 5, the mower obtains the deviation d between the current position and the planned path through comparing the planned path with the position information obtained in real time by the positioning module, and determines whether there is a missing mowing area for mower according to the deviation d. When the deviation d is greater than the distance threshold $d_{min}$, it is determined that there is a missing mowing area. Otherwise, it is determined that there is no missing mowing area, and the mower is controlled to adjust the forward direction to continue mowing according to the planned path. When it is determined that there is a missing mowing area, the mower generates a missing mowing area according to the current position information and the planned path. Then, the mower will perform the supplementary mowing in the missing mowing area under the guidance of the navigation module.

In the S290, the mower may be controlled to retreat or turn to perform the supplementary mowing in the missing mowing area. Then, the mower is controlled to adjust the forward direction, so that the mower returns to the planned path.

Figure 32:
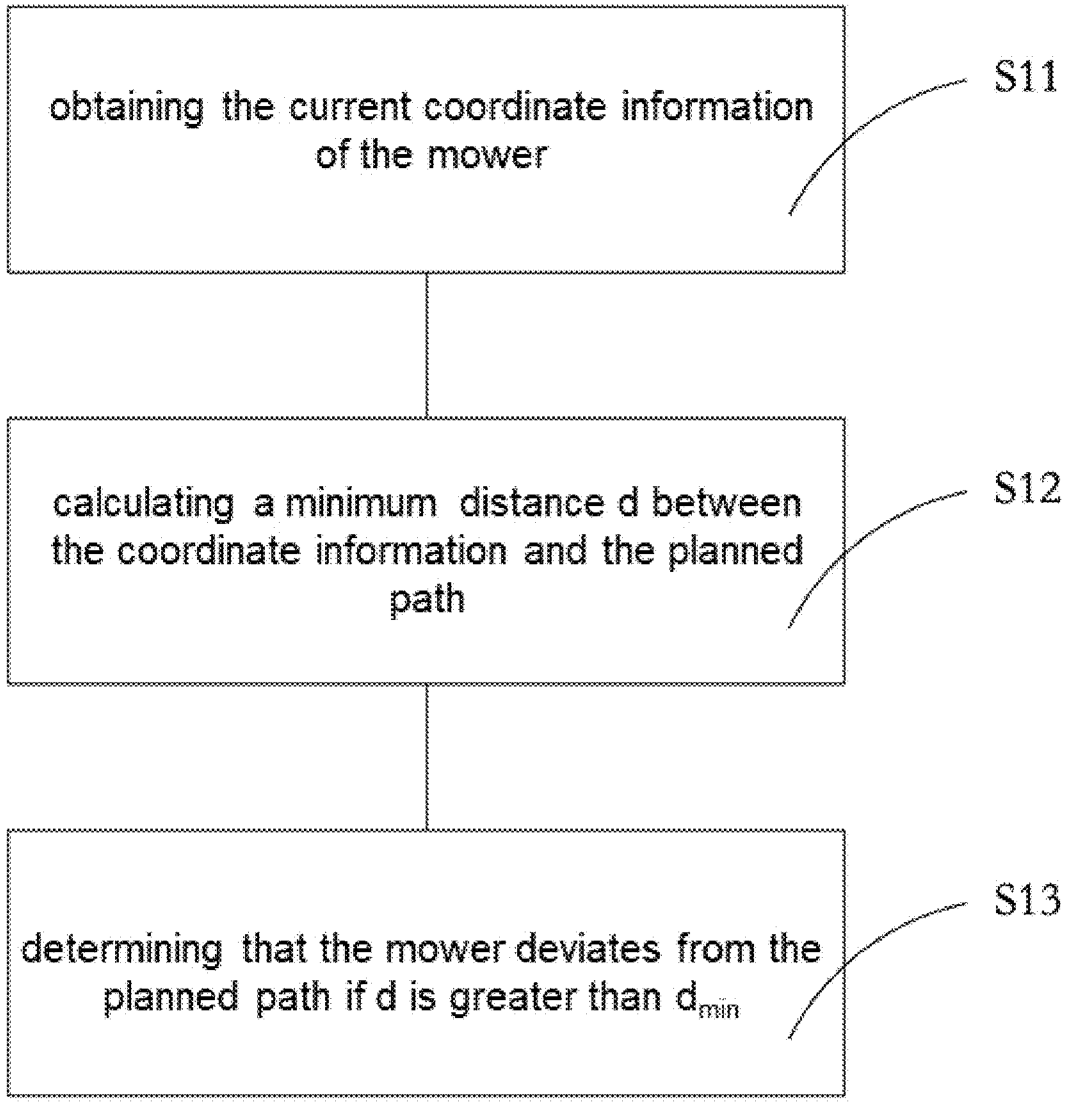
FIG. 32 is a schematic flowchart of judging whether a missing mowing area is formed according to the disclosure.

Please refer to FIG. 32, in this embodiment, the operation of obtaining the current coordinate information of the mower, determining whether the mower 200 deviates from the planned path 101 according to the coordinate information, and forming the missing mowing area 102 includes:

S11: obtaining the current coordinate information of the mower 200,

S12: calculating the minimum distance d between the coordinate information and the planned path 101, S13: determining that the mower 200 deviates from the planned path if d is greater than $d_{min}$. The distance threshold $d_{min}$ may be set by the user as needed.

Please refer to FIG. 33, if the mower 200 deviates from the planned path 101, an operation of controlling the mower 200 to return to the planned path 101 to perform the supplementary mowing in the missing mowing area 102 includes:

S21: controlling the mower 200 to move forward to gradually return to the planned path 101.

S22: controlling the mower 200 to return to a position before deviation along the planned path 101 at the first speed.

S23: controlling the mower 200 to move forward to the position before returning along the planned path 101 at the second speed.

When the mower 200 returns to the position J before the deviation at the first speed, the working unit of the mower 200 works. When the mower 200 moves forward to the position K before returning at the second speed, the working unit of the mower 200 stops working or works at a low speed. In some embodiments, the first speed is less than the second speed. Of course, it can also be set as: when the mower returns to the position J before the deviation at the first speed, the working unit of the mower stops working or works at a low speed, when the mower move forward to the position K before returning at the second speed, the working unit of the mower works, and at this time, the first speed is greater than the second speed.

Figure 34:
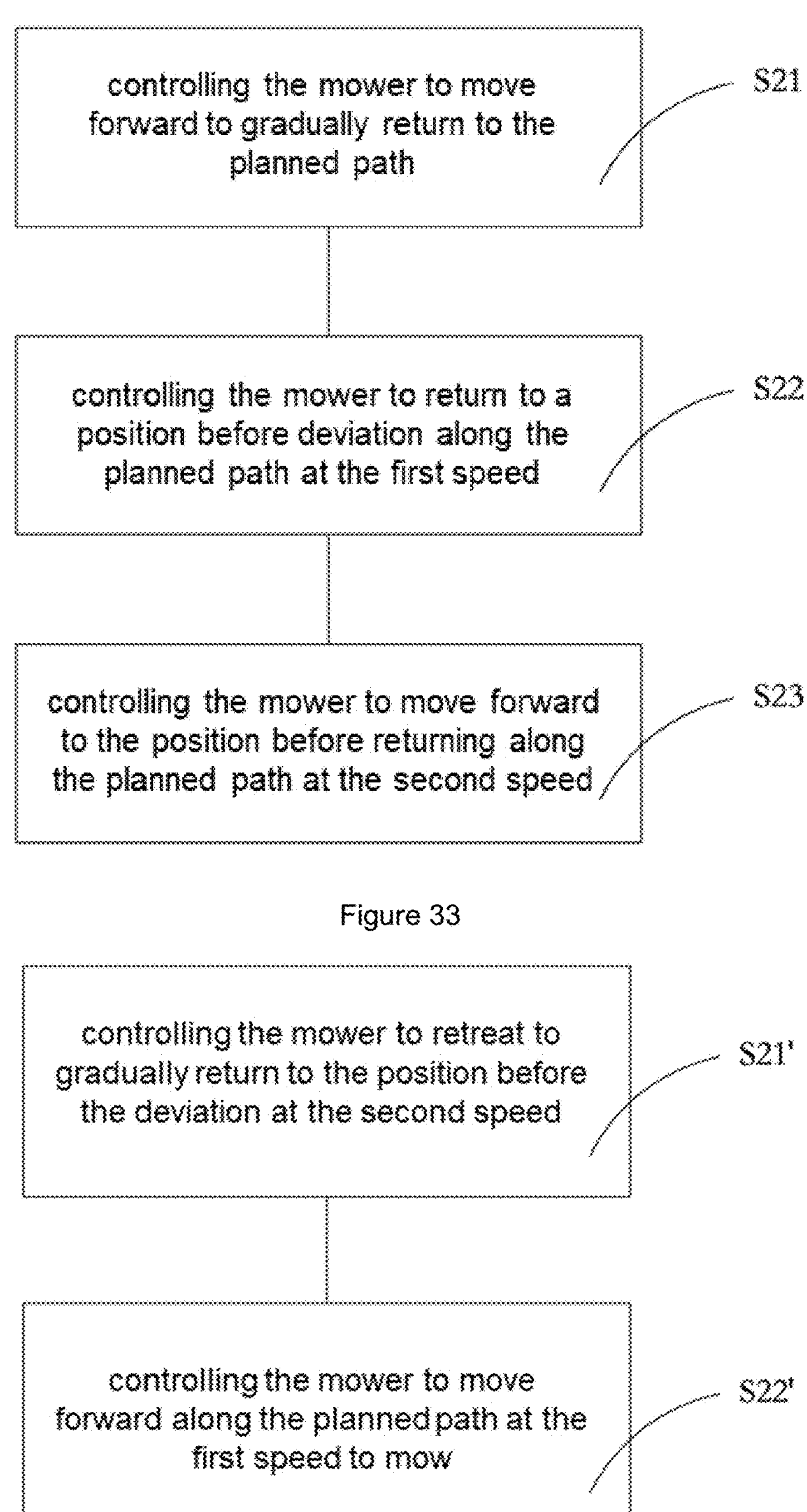
FIG. 34 is a flowchart of supplementary mowing of the missing mowing area according to another embodiment.

Please refer to FIG. 34. Of course, it can be understood that, in other embodiments, supplementary mowing in the missing mowing area 102 may also includes following operations:

S21': controlling the mower 200 to retreat to gradually return to the position J before the deviation at the second speed, S22': controlling the mower 200 to move forward along the planned path 101 at the first speed to mow.

At this time, the first speed is the speed of the mower when running normally, and the second speed is greater than the first speed.

The mower 200 of the disclosure can automatically adjust a traveling direction of the mower 200 when it deviates from the planned path 101 to perform the supplementary mowing in the missing mowing area 102, thereby reducing labor intensity of the user.

Figure 35:
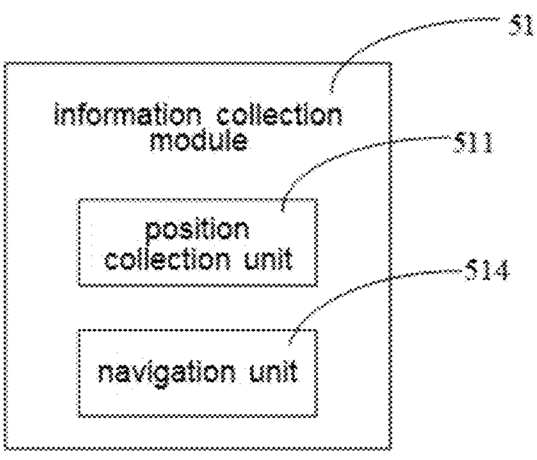
FIG. 35 is a block schematic view of an information collection module.
Figure 37:
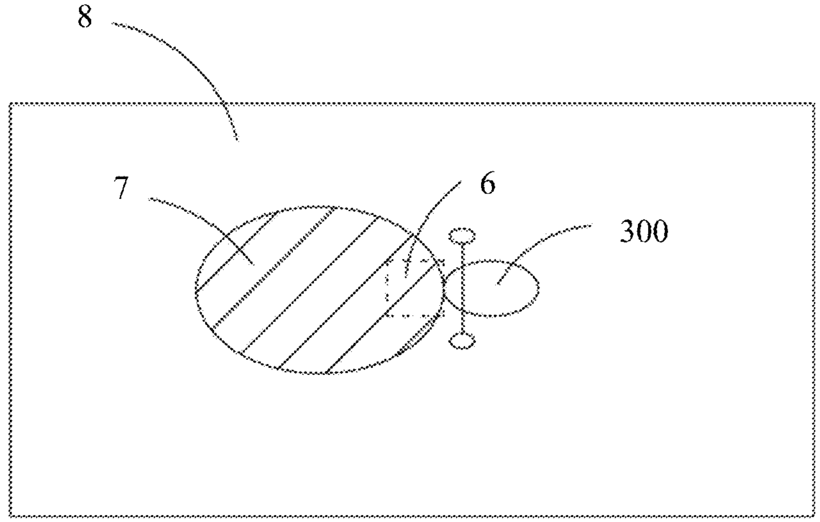
FIG. 37 is a schematic view of a scene where an area to be operated is located in a mowed area.
Figure 38:
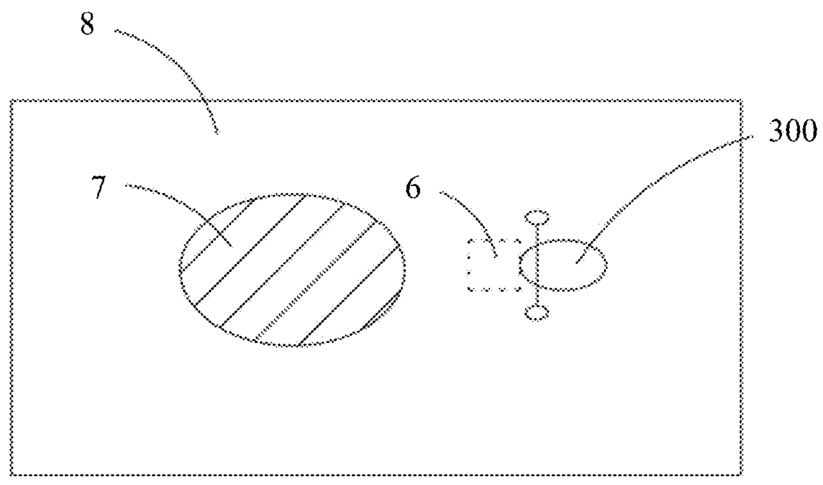
FIG. 38 is a schematic view of a scene where the area to be operated is located in an unmowed area.

Please refer to FIG. 25 and FIG. 35. In another embodiment, the robotic mower 1 further includes the information collection module 51 and the control module 12 mentioned above. The robotic mower 1 is described by taking a mower 300 as an example. Specifically, the information collection module 51 is also configured to collect area information of an area to be operated 6 (as shown in FIG. 37), and to determine whether the area to be operated 6 has completed mowing according to the area information. The area to be operated 6 is an area where the mower 300 will work. The control module 12 controls a working state of the working unit (a cutting assembly, not shown) of the mower 300 according to whether the area to be operated 6 has been completed. Please refer to FIG. 37, the area to be operated 6 is located in a completed area 7 where a mowing has been completed, and the area to be operated 6 is a completed mowing area at this time. Then, the control module 12 controls the working unit to work at a first rotation speed, and controls the mower 300 to pass through the area to be operated 6 at a first traveling speed. Please refer to FIG. 38, the area to be operated 6 is located in an uncompleted area 8 where the mowing has not been completed, and the area to be operated 6 is an uncompleted mowing area at this time. Then, the control module 12 controls the working unit to work at a second rotation speed, and controls the mower 300 to pass through the area to be operated 6 at a second traveling speed. Wherein, the first rotation speed is less than the second rotation speed. Since the working unit of the mower 300 passing through an area where the mowing has been completed is working at a low rotation speed, power may be effectively saved, thereby prolonging working time of the mower 300. In some embodiments, the first rotation speed is zero.

In some embodiments, the first traveling speed is greater than the second traveling speed, which means that when the mower 300 passes through the area where the mowing has been completed, the mower passes at a high speed. With this configuration, it can effectively improve operation efficiency of the mower 300 and avoid the mower from wasting time in the area where the mowing has been completed.

Please refer to FIG. 35, in this embodiment, the information collection module 51 further includes the position collection unit 511 mentioned above and a navigation unit 514. The position collection unit 51 is configured to collect area information of the area to be operated 6, and the area information is coordinate information of the area to be operated 6. The position collection unit 511 may be an RTK (real time kinematic) positioning module. The navigation unit 514 determines whether a corresponding area on the navigation map is marked as a completed mowing area according to the coordinate information. When the area corresponding to the coordinate information on the navigation map is marked as a completed mowing area, the control module 12 controls the working unit to work at the first rotation speed. When the area corresponding to the coordinate information on the navigation map is marked as an uncompleted mowing area, the control module 12 controls the working unit to work at the second rotation speed. Moreover, after the mower 300 completes the mowing of the area to be operated 6, the navigation unit 514 marks the area corresponding to the coordinate information on the navigation map as a completed mowing area.

Figure 36:
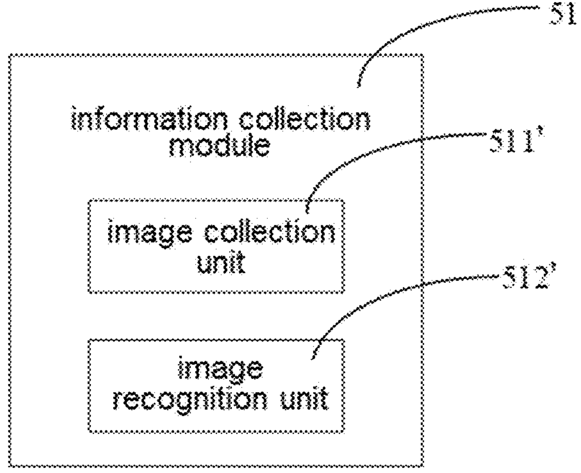
FIG. 36 is a block schematic view of an information collection module according to another embodiment.

Please refer to FIG. 36. In other embodiments, the robotic mower 1 further includes the information collection module 51 and the control module 12 mentioned above. The robotic mower 1 is described by taking the mower 300 as an example. Specifically, the information collection module 51 includes an image collection unit 511' and an image recognition unit 512'. The image collection unit 511' is configured to collect a real-time image of the area to be operated 6. The image recognition unit 512' is configured to analyze the real-time image to determine whether the area to be operated 6 is a completed mowing area. In practical applications, multiple images of lawns that have been mowed may be pre-stored in the image recognition unit 512'. The image recognition unit 512' compares a difference between the real-time image and the pre-stored image, so as to calculate whether the area to be operated 6 is a completed mowing area.

Figure 39:
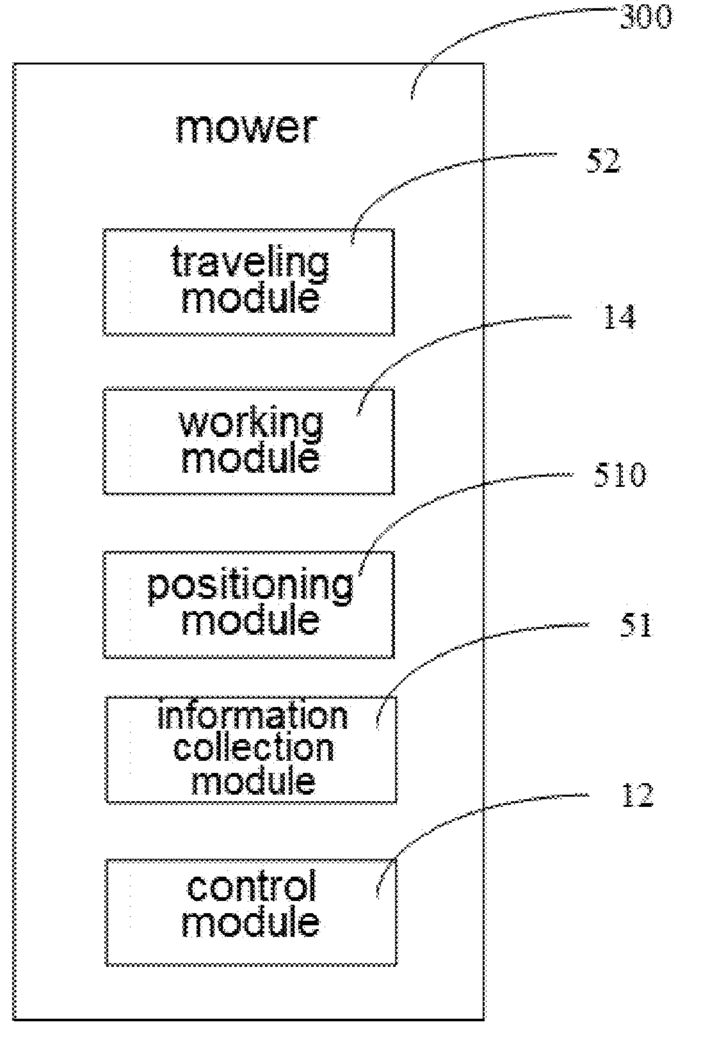
FIG. 39 is a block schematic view of a mower according to another embodiment of the disclosure.

Please refer to FIG. 39, in this embodiment, the mower 300 includes the traveling module 52, the working module 14, the positioning module 510, the information collection module 51, and the control module 12 mentioned above. The traveling module 52 is configured to drive the mower 300 to realize self-propelling. The working module 14 is configured to perform a mowing function of the mower 300. The positioning module 510 is configured for real-time positioning of the mower 300, so as to obtain the position information of the mower. In this embodiment, the positioning module 510 is the RTK positioning module. The mower 300 includes a first working mode and a second working mode. Wherein, working power of the first working mode is greater than working power of the second working mode. In this embodiment, the first working mode is a normal mowing mode, and the second working mode is a stopping mowing mode. However, in other embodiments, the first working mode may be set to the normal mowing mode, and the second working mode is set to a low speed mowing mode. The control module 12 controls the mower 300 to perform self-propelled mowing in the working area in the first working mode. At the same time, the information collection module 51 records the working area where the mower 300 has completed mowing in the first working mode, and marks it as a mowed area. In this embodiment, the information collection module 51 obtains the current position information through the positioning module 510, and then marks a position corresponding to the current position information on the navigation map. When the area corresponding to the current position information has been mowed, the area is marked as a mowed area. A working area except the mowed area is marked as an unmowed area. When the mower enters the unmowed area, the control module 12 controls the working module 14 to perform self-propelled mowing in the first working mode. When the mower enters the mowed area again, the control module 12 controls the working module 14 to self-propelled in the second working mode.

Figure 40:
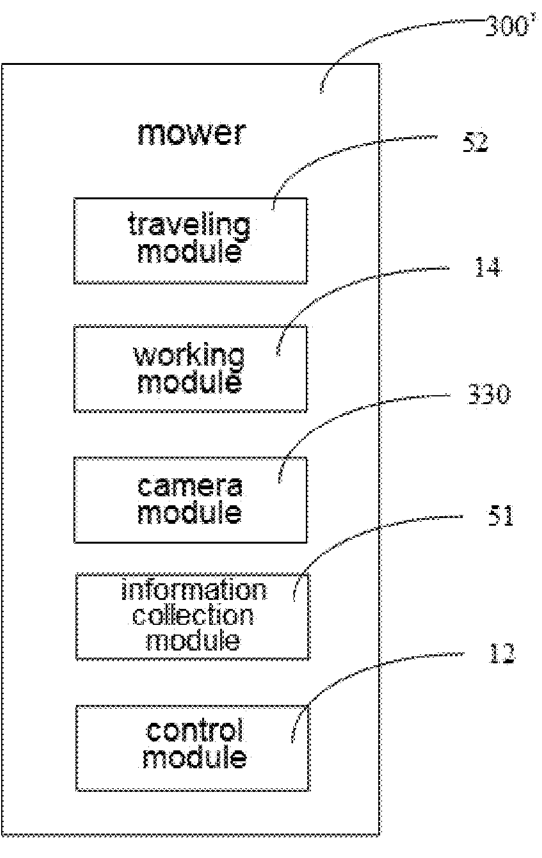
FIG. 40 is a block schematic view of a mower according to yet another embodiment of the disclosure.

Please refer to FIG. 40. In another embodiment, the disclosure provides a mower 300'. The mower 300' includes the traveling module 52, the working module 14, a camera module 330, the information collection module 51, and the control module 12. The camera module 330 is configured to collect real-time images of the area to be operated. The mower 300' includes the first working mode and the second working mode. Wherein, the working power of the first working mode is greater than the working power of the second working mode. In this embodiment, the first working mode is the normal mowing mode, and the second working mode is the stopping mowing mode. However, in other embodiments, the first working mode may be set to the normal mowing mode, and the second working mode is set to the low speed mowing mode. The control module 12 controls the mower 300' to perform the self-propelled mowing in the working area in the first working mode. At the same time, the information collection module 51 records the working area where the mower has completed mowing in the first work mode, and marks it as a mowed area. In this embodiment, the control module 12 analyzes the real-time image of the area to be operated collected by the camera module 330 to determine whether the area to be operated is a completed mowing area. If the area to be operated is a completed mowing area, the area is marked as a mowed area on the navigation map. The working area except the mowed area is marked as an unmowed area. When the mower enters the unmowed area, the control module 12 controls the working module 14 to perform the self-propelled mowing in the first working mode. When the mower enters the mowed area again, the control module 12 controls the working module 14 to self-propelled in the second working mode.

Figure 41:
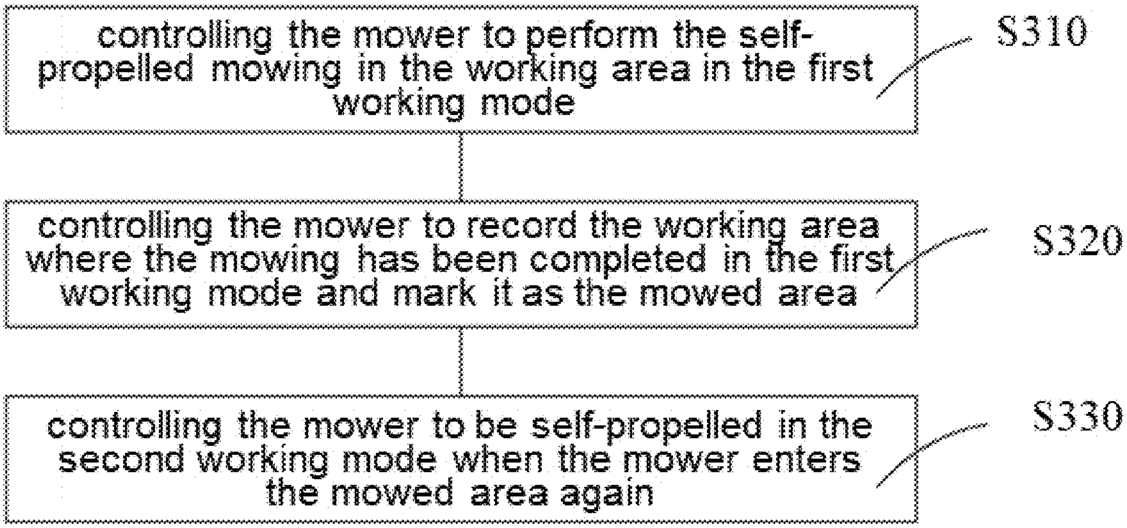
FIG. 41 is a schematic flowchart of a control method for a mower according to one embodiment of the disclosure.

Please refer to FIG. 41. The disclosure further provides a control method for a mower. The control method for the mower includes following operations:

S310: controlling the mower to perform the self-propelled mowing in the working area in the first working mode.

Figures 44, 45, 46:
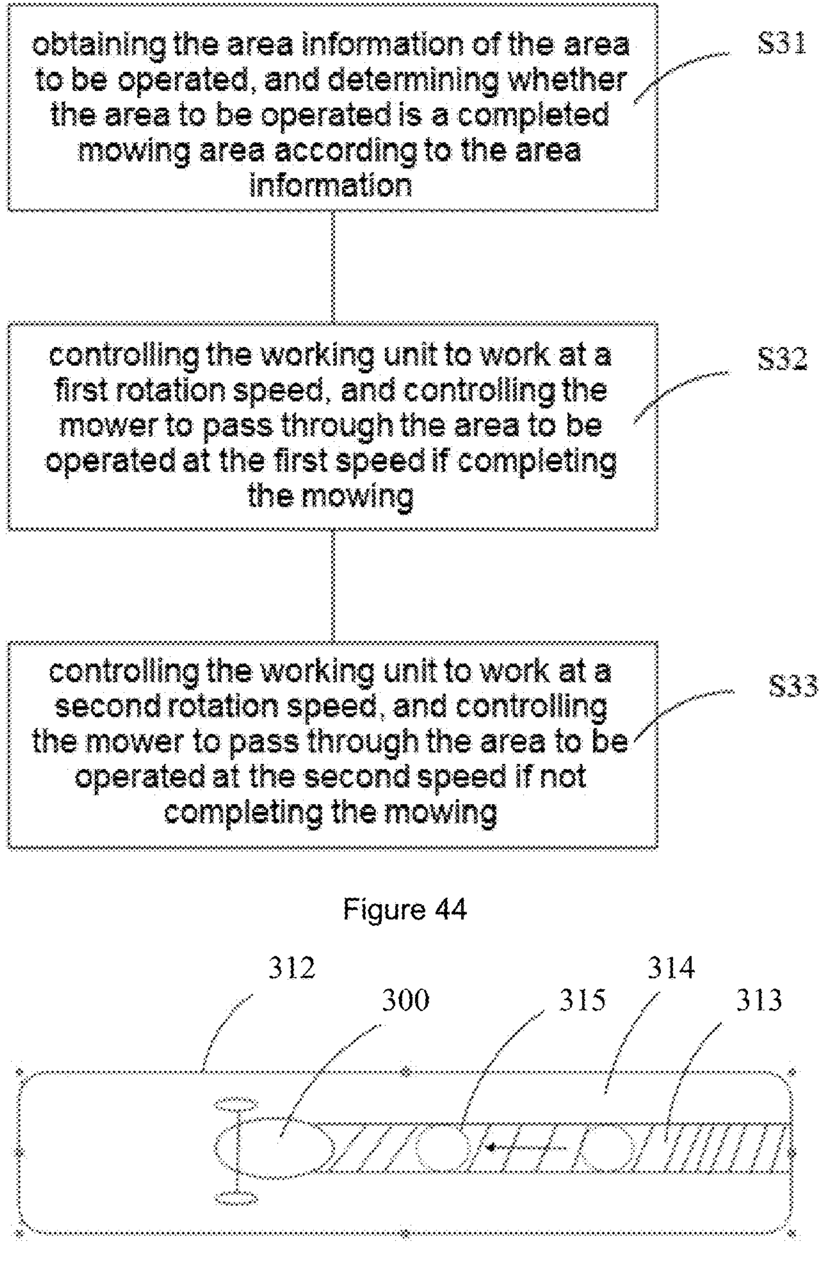
FIG. 44 is a schematic flowchart of a control method for a mower according to yet another embodiment of the disclosure.
FIG. 45 is an operation schematic view of the mower in a working area.
FIG. 46 is an operation schematic view of the mower entering from the mowed area into the unmowed area.

Please refer to FIG. 45, the mower is controlled by the navigation module to mow autonomously in the working area 312. Wherein, an area 313 is the mowed area, an area 314 is the unmowed area, and a trajectory line 315 is an operation trajectory of a cutter.

S320: controlling the mower to record the working area where the mowing has been completed in the first working mode and mark it as the mowed area.

S330: controlling the mower to be self-propelled in the second working mode when the mower enters the mowed area again.

Figure 47:
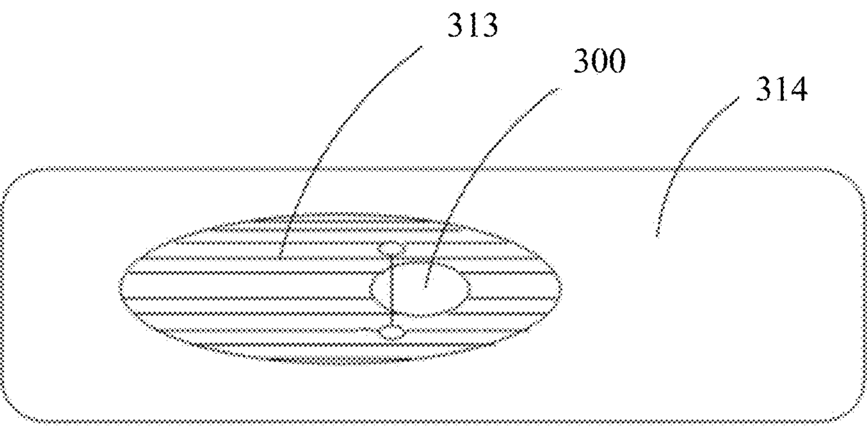
FIG. 47 is an operation schematic view of the mower reentering the mowed area.

Please refer to FIG. 47, when the mower enters the mowed area 313 again, the mower is controlled to be self-propelled in the second working mode, thereby saving energy.

Wherein, the working power of the mower in the first working mode is greater than the working power in the second working mode. In this embodiment, the first working mode is a normal mowing mode, and the second working mode is a stopping mowing mode.

Figures 42, 43:
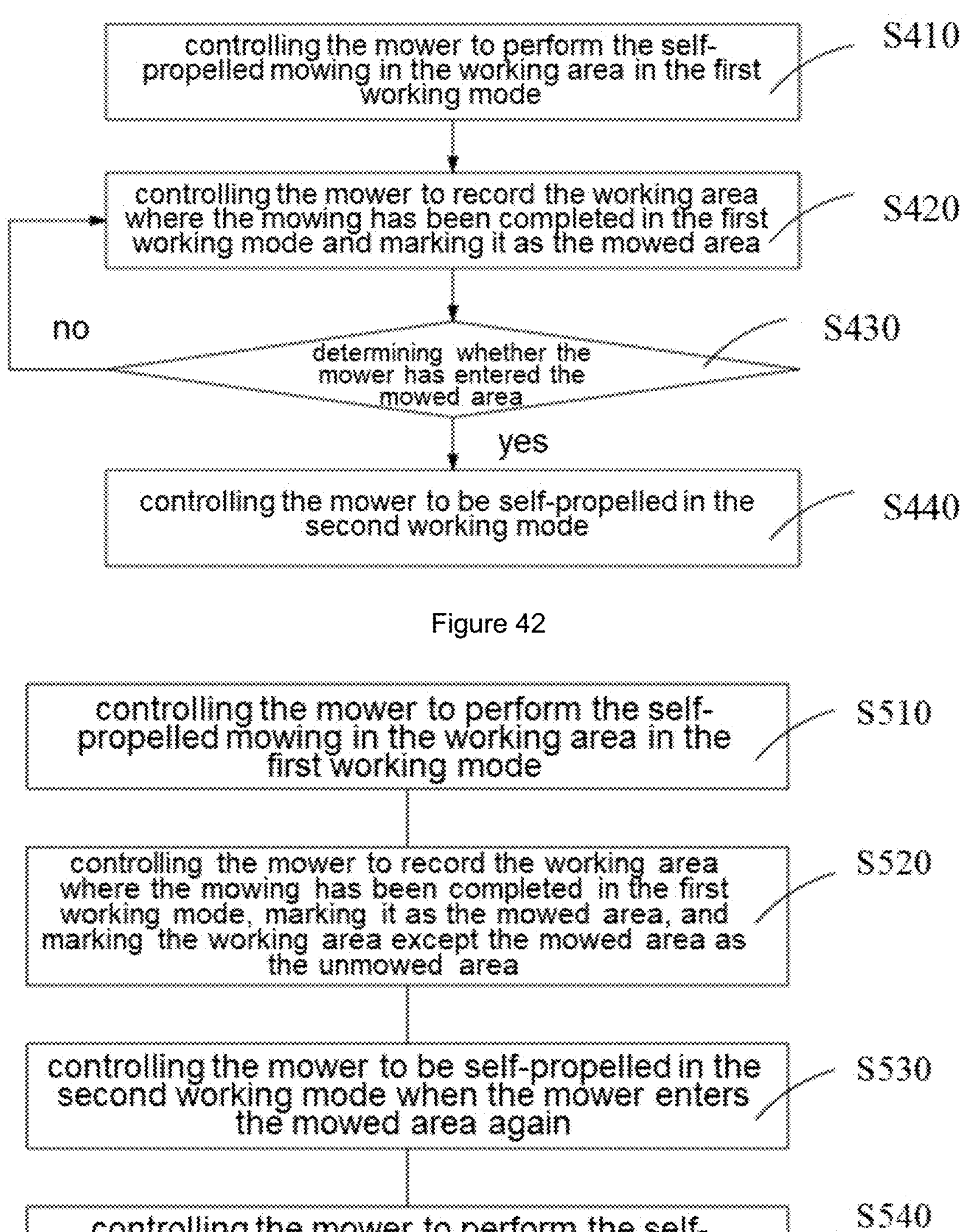
FIG. 42 is a schematic flowchart of a control method for a mower according to another embodiment of the disclosure.
FIG. 43 is a schematic flowchart of a control method for a mower according to yet another embodiment of the disclosure.

Please refer to FIG. 42, the disclosure further provides a control method for a mower. The control method for the mower includes following operations:

S410: controlling the mower to perform the self-propelled mowing in the working area in the first working mode.

Please refer to FIG. 45, the mower is controlled by the navigation module to mow autonomously in the working area 312. Wherein, the area 313 is the mowed area, the area 314 is the unmowed area, and the trajectory line 315 is the working trajectory of the cutter.

S420: controlling the mower to record the working area where the mowing has been completed in the first working mode and marking it as the mowed area.

S430: determining whether the mower has entered the mowed area, if yes, skipping to S440, otherwise, skipping to the S420.

S440: controlling the mower to be self-propelled in the second working mode.

Please refer to FIG. 47, when the mower enters the mowed area 313 again, the mower is controlled to be self-propelled in the second working mode, thereby saving energy.

Wherein, the working power of the mower in the first working mode is greater than the working power in the second working mode. In this embodiment, the first working mode is the normal mowing mode, and the second working mode is the stopping mowing mode.

Please refer to FIG. 43. The disclosure further provides a control method for a mower, the control method includes following operations:

S510: controlling the mower to perform the self-propelled mowing in the working area in the first working mode.

Please refer to FIG. 45, the mower is controlled by the navigation module to mow autonomously in the working area 312. Wherein, the area 313 is the mowed area, the area 314 is the unmowed area, and the trajectory line 315 is the working trajectory of the cutter.

S520: controlling the mower to record the working area where the mowing has been completed in the first working mode, marking it as the mowed area, and marking the working area except the mowed area as the unmowed area;

S530: controlling the mower to be self-propelled in the second working mode when the mower enters the mowed area again.

Please refer to FIG. 47. When the mower enters the mowed area 313 again, the mower 311 is controlled to be self-propelled in the second working mode, thereby saving energy.

S540: controlling the mower to perform the self-propelled mowing in the first working mode when the mower enters the unmowed area.

Please refer to FIG. 46, when the mower enters the unmowed area 314, the mower is controlled to perform the self-propelled mowing in the first working mode to complete the mowing.

Wherein, the working power of the mower in the first working mode is greater than the working power in the second working mode. In this embodiment, the first working mode is the normal mowing mode, and the second working mode is the stopping mowing mode.

The disclosure further provides a control method for controlling a mower. The control method for controlling the mower includes following operations:

S31: obtaining the area information of the area to be operated 6, and determining whether the area to be operated 6 is a completed mowing area according to the area information.

S32: controlling the working unit to work at the first rotation speed, and controlling the mower to pass through the area to be operated 6 at the first speed if completing the mowing.

S33: controlling the working unit to work at the second rotation speed, and controlling the mower to pass through the area to be operated 6 at the second speed if not completing the mowing. Wherein, the first speed is greater than the second speed.

The S31 further includes following operations:

S311: obtaining the area information of the area to be operated 6, the area information being the coordinate information of the area to be operated 6.

S312: determining whether the area corresponding to the coordinate information is marked as a complete mowing area on the navigation map.

The S33 further includes following operations:

S331: controlling the working unit to work,

S332: marking the area corresponding to the coordinate information on the navigation map as a completed mowing area.

Of course, it can be understood that, in other embodiments, the S1 may also be following operations:

S311': obtaining the area information of the area to be operated 6, the area information being a real-time image of the area to be operated 6.

S312': analyzing the real-time image to determine whether the area to be operated 6 is a completed mowing area.

The mower of the disclosure can control the working state of the working unit of the mower according to whether the area to be operated 6 is a completed mowing area, thereby effectively saving power and prolonging the working time of the mower.

Figure 48:
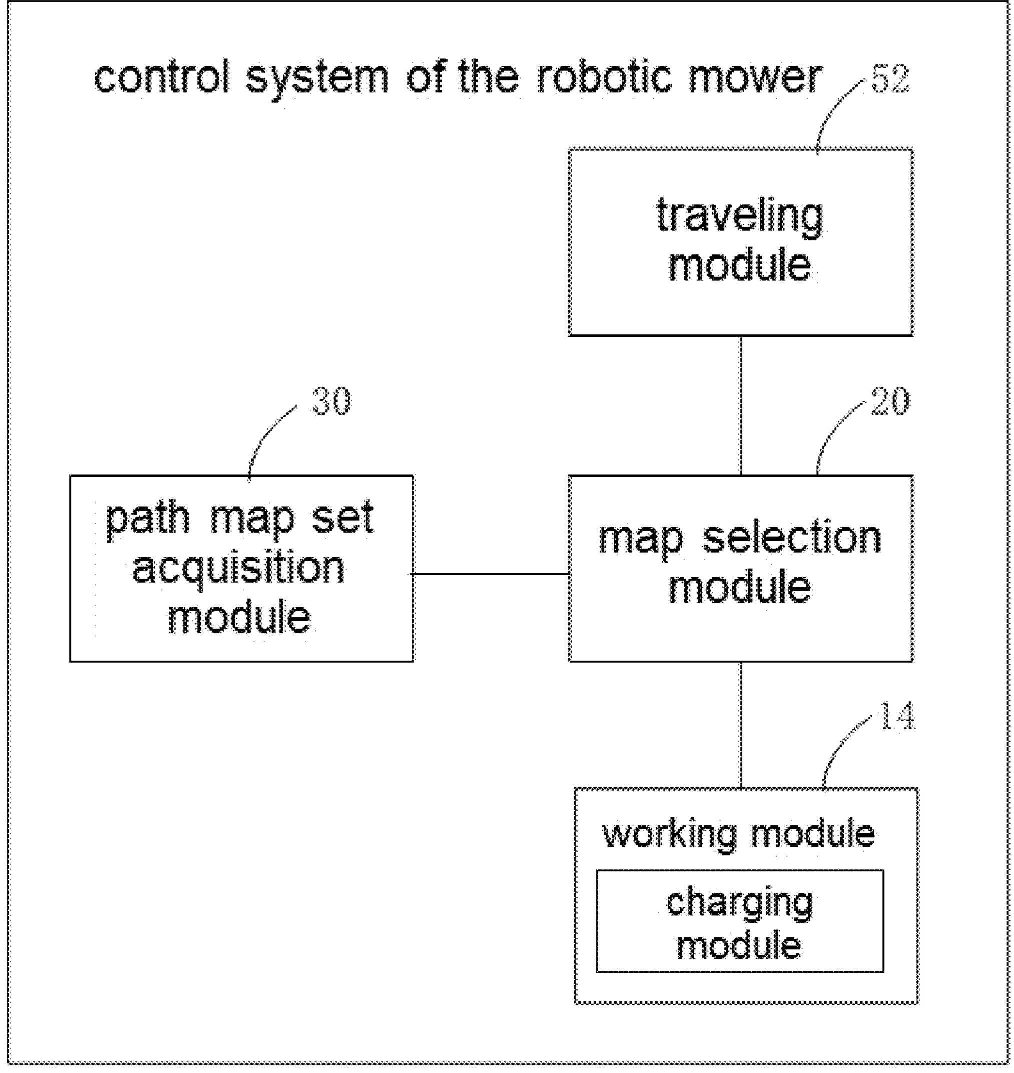
FIG. 48 is a structural block view of a control system of the robotic mower of the disclosure.

Please refer to FIG. 48. In another embodiment, the disclosure further provides a control system. In addition to the traveling module 52 and working module 14 mentioned above, the control system further includes a map selection module 20 and a path map set acquisition module 30. The traveling module 52 is configured to control the robotic mower to move to the starting point. The map selection module 20 is configured to select the path map from the pre-stored path map set according to a preset rule. Wherein, the path map set is a path map planned in advance according to different traveling angles by the robotic mower in the working area. The working module 14 controls the robotic mower to move and work according to the selected path map. The path map set acquisition module 30 is configured to obtain the path map set.

Please refer to FIG. 48, the working module 14 further includes a charging module, which is configured to control the mower to return to the charger station and record the return point of the mower when the power of the robotic mower is insufficient. After charging, the mower returns to the return point and continues to move along the original path. The charging module is also configured to control the robotic mower to return to the charger station and record the return point of the robotic mower when the weather is not suitable for the robotic mower to work. After charging or when the weather is suitable for the robotic mower to mow, the robotic mower returns to the return point and continues to move along the original path.

In the disclosure, the control system further includes a mowing period setting module (not shown), which is configured to preset a mowing period to control the robotic mower to perform the mowing within a preset mowing period, while the robotic mower stops mowing in other periods except the preset mowing period.

In the disclosure, the map selection module 20 may further include a first map selection module, a second map selection module, and a third map selection module. The first map selection module is configured to select the path map from the pre-stored path map set in a random manner. The second map selection module is configured to select the path map from the pre-stored path map set each time in an incremental or decremental way of the traveling angle. The third map selection module is configured to select the path map from the pre-stored path map set according to the received external instruction.

Figure 49:
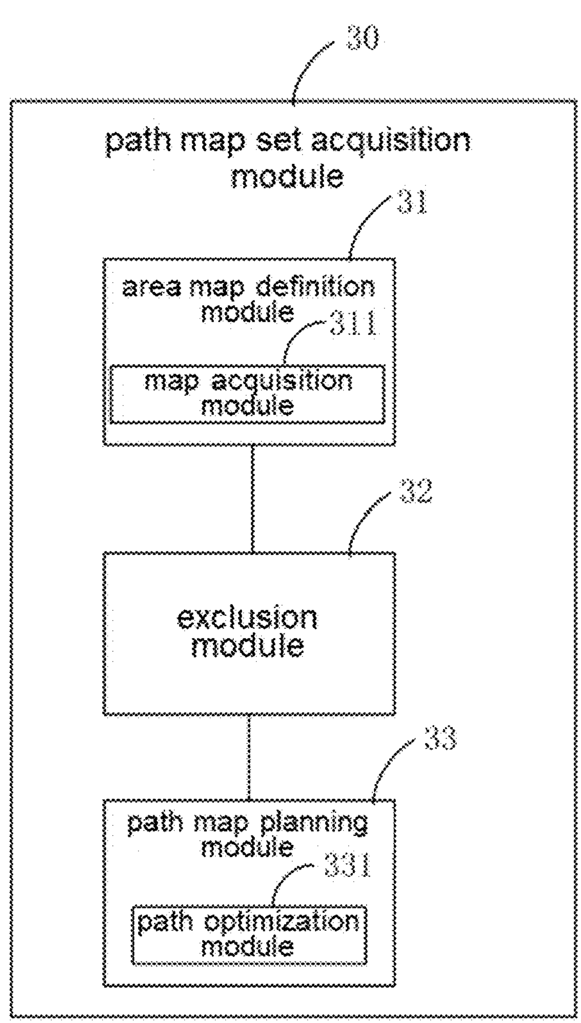
FIG. 49 is a structural block view of a map set acquisition module of the disclosure.

Please refer to FIG. 49, the path map set acquisition module 30 includes an area map definition module 31, an exclusion module 32, and a path map planning module 33. The area map definition module 31 is configured to define the working area map of the robotic mower. The exclusion module 32 is configured to control the robotic mower to move along the edge of the obstacle in the working area, collect and save the position of the obstacle, and mark it as an exclusion area on the working area map. A function of the exclusion module 32 is similar to a function of the data processing unit 231 mentioned above, which is marking the obstacles on the working area map. The path map planning module 33 is configured to plan the path maps of the robotic mower when the robotic mower moves along different traveling angles in the working area according to the working area map of the robotic mower to form the path map set. The path planning module 33 plays a similar role to the path planning unit 232 mentioned above, and is configured to plan a working path on the working area map. The area map definition module 31 further includes a map acquisition module 311 for controlling the robotic mower to walk along an edge of the working area, collecting and storing the position of the working area to obtain the working area map. The map acquisition module 311 plays a similar role to the position collection device 5 mentioned above, and is configured to define the working area map of the robotic mower so as to plan the working path on the working area map. The path map planning module 33 further includes a path optimization module 331 for optimizing the path map to minimize a number of turns of the robotic mower.

It should be noted that each of functional modules or functional sub-modules mentioned above may be fully or partially integrated into one physical entity in actual implementation, or may be physically separated. And these units may all be implemented in a form of software calling through a processing component, or they may also be implemented in a form of hardware, or part of the units in a form of software calling through a processing component and part of the units in the form of hardware. In addition, all or part of these units may be integrated together or implemented independently. The processing component mentioned here may be an integrated circuit with signal processing capability. In an implementation process, each operation of the above method or each of the above modules may be completed by an integrated logic circuit of a hardware in a component of a processor 71 or instructions in the form of software.

Figure 50:
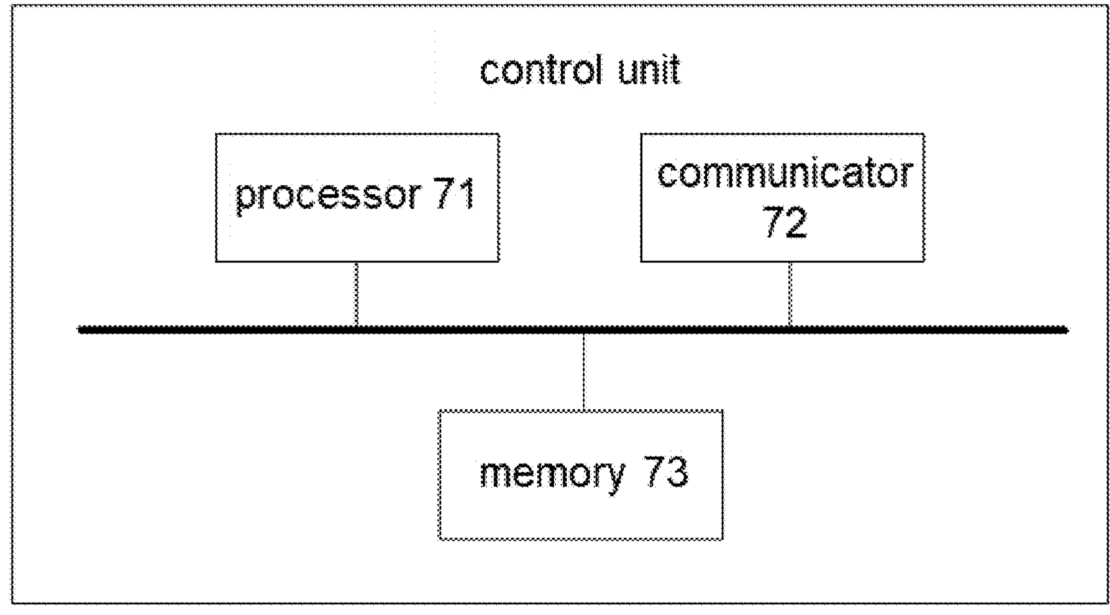
FIG. 50 is a structural block view of a control unit of the disclosure.

It should be noted that, as shown in FIG. 50, the control method of the robotic mower of the disclosure may also be implemented by a control module 12 arranged on the casing of the robotic mower. The control module 12 includes a memory 73 and the processor 71 connected with each other. The memory 73 stores a program instruction, and when the program instruction is executed by the processor 71, the control method of the robotic mower mentioned above is realized. It should be noted that when it is necessary to communicate with outside, the control module 12 further includes a communicator 72, and the communicator 72 is connected with the processor 71.

The processor 71 mentioned above may be a general-purpose processor. It includes a central processing unit (CPU for short), a network processor (NP for short), etc. It may also be a Digital Signal Processing (DSP), Application Specific Integrated Circuit (ASIC), Field-Programmable Gate Array (FPGA) or other programmable logic devices, discrete gates or transistor logic devices, discrete hardware assemblies. The memory 73 may include a random access memory (RAM for short), or may also include a non-volatile memory, such as at least one disk memory.

It should be noted that a control program instruction in the memory 73 may be implemented in a form of a software functional unit and when sold or used as an independent product, they may be stored in a computer-readable storage medium. Based on this understanding, a technical solution of the disclosure essentially or a part that contributes to the conventional technology or a part of the technical solution may be embodied in a form of a software product. A computer software product is stored in a storage medium and includes several instructions to enable a computer (which may be a personal computer, an electronic device, or a network device, etc.) to execute all or part of the operations of the method in various embodiments of the disclosure.

The disclosure may further provide a storage medium that stores a program, and when the program is executed by the processor 71, the control method of the robotic mower mentioned above is realized. The storage medium includes all forms of non-volatile memory, media and storage devices, including, for example: semiconductor memory devices such as EPROM, EEPROM and flash memory devices, disks such as internal hard drives or removable disks, magneto-optical disk, and CD-ROM and DVD-ROM disks.

In summary, the robotic mower of the disclosure selects any path map from the pre-stored path map set every time when mowing, so that the running path of the robotic mower is different each time, which avoids a problem of repeated rolling and rutting when walking along the fixed path. Compared with a random operation mode, the robotic mower and its control method, system and storage medium of the disclosure may not only 100% cover the working area, but also reduce unnecessary repetitive operations and reduce the use of parts. With the control system and method of the robotic mower of the disclosure, a mowing operation of an entire working area may be completed in one operation under a condition that the battery of the robotic mower allows. With the control system and method of the robotic mower of the disclosure, an exact time required to mow may be estimated, in other words, a time when the lawn is ready may be estimated.

Figure 51:
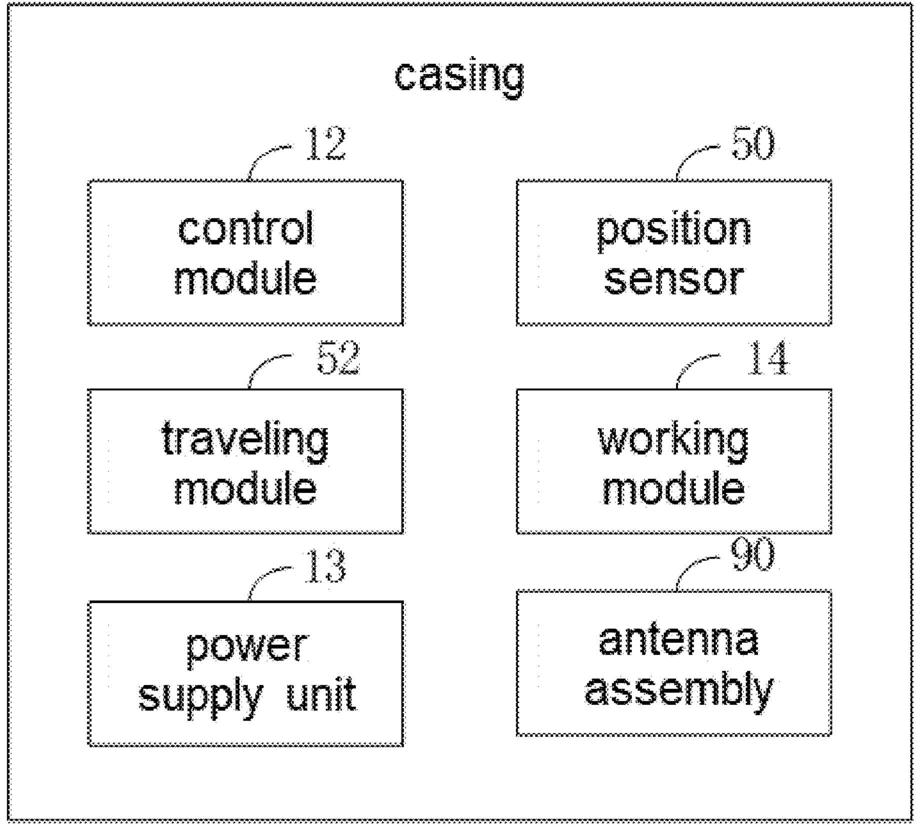
FIG. 51 is a structural block view of the robotic mower of the disclosure.

As shown in FIG. 51, the embodiment of the disclosure further provides a robotic mower. The robotic mower includes the casing. The robotic mower includes the position sensor 50, the control module 12, the traveling module 52, the working module 14, the power supply unit 13, and an antenna assembly 90 arranged on the casing. The control module 12 can control the robotic mower to move along a different path each time it works, which can avoid repeated rolling and rutting in the working area.

As shown in FIG. 51, the traveling module 52 is provided with two driving wheels and at least one supporting wheel. The two driving wheels are respectively arranged on both sides of one end of the casing, and the supporting wheel is arranged on the other end of the casing. The robotic mower is supported and traveled by the driving wheels and the supporting wheel, and the supporting wheel may be, for example, a universal wheel, so that the robotic mower may turn. The driving wheel may be connected with the driving motor through a transmission shaft, for example, and a protective cover is arranged on the transmission shaft. The protective cover includes a flexible section, and the protective cover realizes a change of a length along an axial direction of the transmission shaft through a deformation of the flexible section, which effectively protects the transmission shaft and may increase service life of the robotic mower. The control module 12 controls the traveling direction and speed of the robotic mower by controlling rotation speeds of the two driving motors. When the rotation speeds of the driving motors are different, the robotic mower may realize turning. When the rotation speeds of the driving motors are the same, the robotic mower may realize straight line traveling, and when the rotation speeds of the driving motors are opposite, the robotic mower 200 realizes zero-position turning in situ.

As shown in FIG. 51, the working module 14 includes a cutting motor and a cutter driven by the cutting motor. The working module 14 is roughly located at a center of the robotic mower. A rotation axis of the cutting motor is roughly perpendicular to a horizontal plane. The height of the working module 14 to the ground may be adjusted by the user to realize an adjustment of a cutting height.

As shown in FIG. 51, the power supply unit 13 includes the rechargeable battery, a charging system for supplying power to the rechargeable battery, and a solar panel arranged on an outside of the casing. The solar panel is connected with the rechargeable battery through the charging system. Considering that robotic mowers generally work outdoors, the rechargeable battery may be charged during the mowing of the robotic mower, thereby effectively extending an operation time of the robotic mower and reducing return times to the charger station for recharging.

As shown in FIG. 51, in addition to the functions described above, the control module 12 can also receive various signals sent to the robotic mower or signals collected by the position sensor 50, generate a corresponding control signal through a built-in processor, and controls the traveling unit or the working unit according to the generated control signal, which enables the robotic mower to perform mowing along the planned path.

The robotic mower further includes the rain and snow sensor and/or a wind speed sensor arranged on the casing, which is configured to monitor weather condition information at a working place of the robotic mower and transmit the weather condition information to the control module 12. The control module 12 controls the robotic mower to perform corresponding operations according to the weather condition information. For details, please refer to the description of the relevant part above, which will not be repeated here.

As shown in FIG. 51, the position sensor 50 may be, for example, the GPS module. Normally, in order to include the GPS module, the GPS module is generally mounted inside the casing, which will affect a signal strength of the GPS module. In order to solve this problem, the antenna assembly 90 externally attached may be provided for the GPS module to enhance the signal strength of the GPS module and improve the positioning accuracy of the robotic mower. The antenna assembly 90 includes an antenna, an antenna housing and a soft buffer connector. The soft buffer connector may be soft rubber with good elasticity and self-recovery, such as rubber, silicone. The antenna is usually made of a conductive metal. The antenna housing wraps the antenna for protection. A bottom of the antenna housing may be fixed to the soft buffer connector, for example, by pasting, and the soft buffer connector may be fixed on the casing by screws or pasting. The antenna housing is basically vertical relative to an upper surface of the casing, and a shape of the soft buffer connector is symmetrical in a center, so as to balance a tensile force of the soft buffer connector on the antenna housing and cancel each other out in a horizontal direction. The soft buffer connector fixes the antenna housing on the casing and fills a gap between the antenna housing and the casing, which prevents water vapor from entering the machine and damaging electrical components. When the robotic mower is not subjected to an external force, the antenna housing is basically perpendicular to the casing. When the antenna housing is subjected to the external force, the antenna housing is inclined relative to the casing, and the soft buffer connector is pulled and deformed, which stores elastic potential energy. When the external force acting on the antenna housing disappears, the soft buffer connector releases the elastic potential energy, and under an action of the soft buffer connector, the antenna housing returns to a vertical state.

The above description is only a preferred embodiment of the disclosure and an explanation of the applied technical principles. Those skilled in the art should understand that a scope involved in this disclosure is not limited to a technical solution formed by a specific combination of the above technical characteristics, it should also cover other technical solutions formed by any combination of the above technical characteristics or their equivalent characteristics without departing from the concept of the disclosure, such as a technical solution formed by mutually replacing the characteristics mentioned above with the technical characteristics provided in this disclosure (but not limited to) with similar functions.

Except for the technical characteristics described in the specification, the other technical characteristics are known to those skilled in the art. In order to highlight the innovative characteristics of the disclosure, the rest of the technical characteristics will not be repeated here.

What is claimed is:

1. A robotic tool system, comprising:

a robotic tool, configured to move in a working area and perform a work task; and a navigation control device, detachably connected with the robotic tool, comprising:

a navigation assembly, configured to receive a position signal of the robotic tool and/or the navigation control device, a position collection device, comprising:

an information collection module, configured to collect current coordinate information of the position collection device, the information collection module comprises a timing mode to collect the coordinate information at a time interval, an interval mode to collect the coordinate information at a distance interval, and a manual mode to collect the coordinate information triggered by a user, and a control module, configured to control the information collection module to work in one of the timing mode, the interval mode, or the manual mode or a combination thereof according to a received instruction, a planning assembly, configured to receive the position signal transmitted by the navigation assembly and obtain a path map of the working area by using the obtained coordinate information, and a communication assembly, coupled to the robotic tool, transmitting the path map to the robotic tool, wherein the robotic tool is controlled by the navigation control device to run in the working area according to the position signal and the path map so as to perform corresponding work task or return to a charger station, the coordinate information of a boundary line of a working area is obtained through a combination of the timing mode, the interval mode and the manual mode, the manual mode is used for a straight line path, the timing mode is used for a curved path and the interval mode is used for a polyline path.

2. The robotic tool system according to claim 1, wherein the navigation control device further comprises an image collection device, the image collection device is configured to collect an environmental image signal, and the environmental image signal comprises at least a panoramic photo of the working area.

3. The robotic tool system according to claim 2, wherein the navigation assembly further comprises an image processing module coupled to the image collection device, and the image processing module is configured to receive and process the environmental image signal.

4. The robotic tool system according to claim 2, wherein the planning assembly comprises a data processing unit and a path planning unit, the data processing unit is respectively coupled to the navigation assembly and the communication assembly, the data processing unit obtains the position signal and the environmental image signal in real time during a movement of the robotic tool and/or the navigation control device through the navigation assembly, so as to obtain the path map by fitting and be capable of correcting the path map.

5. The robotic tool system according to claim 4, wherein the path planning unit is respectively connected with the data processing unit and the communication assembly, the path planning unit is used to calibrate a marking reference in the path map and set marked reference coordinates, the data processing unit marks obstacles in the path map through the marking reference and the marked reference coordinates, and the path planning unit is capable of setting a boundary of the working area and/or a path for the robotic tool to return to a set position for charging on the path map.

6. The robotic tool system according to claim 2, wherein the navigation assembly comprises a receiving module, the receiving module is capable of receiving the position signal, and the position signal comprises a driving trajectory path and position coordinates of the robotic tool and/or the navigation control device.

7. The robotic tool system according to claim 1, wherein the information collection module comprises:

a position collection unit, configured to collect the coordinate information of the position collection device, a timing trigger unit, configured to trigger the position collection unit to work at the time interval, and an interval trigger unit, configured to trigger the position collection unit to work at the distance interval.

8. The robotic tool system according to claim 7, wherein the interval trigger unit comprises a mileage sensor to sense a traveling distance of the position collection device.

9. The robotic tool system according to claim 1, wherein the position collection device further comprises:

a navigation module, preset with a navigation map, a traveling module, configured to drive the position collection device to travel, and an interaction module, a boundary line of a plot area being marked on the navigation map through the interaction module, the control module controlling the traveling module to work and collecting the coordinate information along the boundary line under a guidance of the navigation module.

10. The robotic tool system according to claim 9, wherein the position collection device further comprises a partition module to divide the boundary line into a straight line area and a curve area, when the position collection device enters the straight line area, the control module controls the position collection device to work in the timing mode, and the time interval of the timing mode is T1, when the position collection device enters the curve area, the control module sets the time interval of the timing mode to be T2, where T1>T2.

11. The robotic tool system according to claim 9, wherein the position collection device further comprises a partition module to divide the boundary line into a straight line area and a curve area, when the position collection device enters the straight line area, the control module controls the position collection device to work in the interval mode, and the distance interval of the interval mode is S1, when the position collection device enters the curve area, the control module sets the distance interval of the interval mode to be S2, where S1>S2.

12. The robotic tool system according to claim 10, wherein the position collection device further comprises a map generation module which is configured to generate an accurate boundary curve of the plot area according to the coordinate information and fit the accurate boundary curve into a map of the plot area.

13. The robotic tool system according to claim 12, wherein the map generation module judges whether the accurate boundary curve is a closed curve, if yes, the map generation module fits the accurate boundary curve into the map of the plot area, if not, the map generation module sends out a prompt message to remind a user to complete a collection of the coordinate information of the plot area.

14. The robotic tool system according to claim 9, wherein the position collection device further comprises a boundary recognition module to recognize a lawn boundary, when a distance between a boundary recognized by the boundary recognition module and the boundary line on the navigation map is less than a threshold, the control module controls the traveling module to work, so that the position collection device moves to the boundary recognized by the boundary recognition module.

15. The robotic tool system according to claim 14, wherein the boundary recognition module comprises an image generation unit configured to capture an image of an area near the position collection device and an image recognition unit to analyze the image captured by the image generation unit to identify the lawn boundary.

16. A method of controlling a robotic tool with a detachably navigation control device, comprising:

controlling the navigation control device move along a boundary of a working area;

collecting coordinate information of the boundary;

using the obtained coordinate information to generate a boundary map;

sending the boundary map to the robotic tool;

controlling the robotic tool to work within the boundary;

wherein, collecting coordinate information of the boundary comprises obtaining the coordinate information of the boundary through a combination of a timing mode, an interval mode and a manual mode, the manual mode is used for a straight line path, the timing mode is used for a curved path and the interval mode is used for a polyline path.

17. The method of claim 16, wherein the method further comprising:

marking coordinate information of obstacles within the boundary.

18. The method of claim 17, wherein the method further comprising: calculating to generate a working path so that the working path covers all working areas and avoids obstacles.

19. The method of claim 18, wherein when boundary information is collected, the information is collected at a time interval or a distance interval, the time interval or the distance interval is adjustable.

20. The robotic tool system according to claim 1, wherein the path map is selected from a pre-stored path map set each time in an incremental or decremental way of a traveling angle, and the traveling angle is defined as an angle between a traveling direction of the robotic mower and a reference line.

* * * * *